(12) United States Patent
Ajami et al.

(10) Patent No.: US 11,844,106 B2
(45) Date of Patent: Dec. 12, 2023

(54) LOW LATENCY SCHEMES FOR PEER-TO-PEER (P2P) COMMUNICATIONS

(71) Applicant: QUALCOMM Incorporated, San Diego, CA (US)

(72) Inventors: Abdel Karim Ajami, San Diego, CA (US); Sai Yiu Duncan Ho, San Diego, CA (US); George Cherian, San Diego, CA (US); Alfred Asterjadhi, San Diego, CA (US); Abhishek Pramod Patil, San Diego, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/482,417

(22) Filed: Sep. 22, 2021

(65) Prior Publication Data

US 2023/0104446 A1    Apr. 6, 2023

(51) Int. Cl.
*H04W 74/08* (2009.01)
(52) U.S. Cl.
CPC .............................. *H04W 74/0808* (2013.01)
(58) Field of Classification Search
CPC .......... H04W 74/0808; H04W 74/006; H04W 72/0446; H04W 74/04; H04W 52/0219;
(Continued)

(56) References Cited

U.S. PATENT DOCUMENTS 9,185,745 B2 * 11/2015 Ghosh .................. H04W 16/14
2018/0146426 A1 * 5/2018 Park ..................... H04L 27/2603
(Continued)

FOREIGN PATENT DOCUMENTS

WO    WO-2018048474 A1 *  3/2018

OTHER PUBLICATIONS

Nezou P (Canon)., et al., "Low-Latency Triggered TWT", IEEE Draft, 11-20-1843-02-Oobe-Low-Latency-Triggered-TWT, IEEE-SA Mentor, Piscataway, NJ USA, vol. 802.11 EHT, 802.11be, No. 2, Dec. 17, 2020, pp. 1-14, Dec. 16, 2020, XP068175533, pp. 2-5. (Year: 2020).*

(Continued)

*Primary Examiner* — Ayaz R Sheikh
*Assistant Examiner* — Louis Samara
(74) *Attorney, Agent, or Firm* — Holland & Hart LLP

(57) ABSTRACT

This disclosure provides systems, methods, and apparatus for managing data traffic in restricted target wake time (TWT) service periods (SPs). In some aspects, an access point (AP) receives a request frame from a wireless station (STA) associated with a client device via a peer-to-peer (P2P) link, the request frame indicating that the STA intends to exchange P2P communications with the client device during a r-TWT SP scheduled on a wireless medium. The AP obtains a transmission opportunity (TXOP) on the wireless medium during the r-TWT SP, the request frame identifying the client device. The AP transmits a trigger frame on the wireless medium responsive to obtaining the TXOP, the trigger frame allocating a portion of the obtained TXOP for P2P communications between the STA and the client device, wherein at least one of the response frame or the trigger frame indicates a Network Allocation Vector (NAV) exception for the client device.

30 Claims, 21 Drawing Sheets

(58) Field of Classification Search
CPC .. H04W 16/14; H04L 5/0098; H04L 27/0006; H04L 5/0007; H04L 27/2603
See application file for complete search history.

(56) References Cited

U.S. PATENT DOCUMENTS

| | | | |
|---|---|---|---|
| 2018/0255581 A1* | 9/2018 | Huang | H04L 5/0007 |
| 2019/0045461 A1 | 2/2019 | Fang et al. | |
| 2019/0191462 A1* | 6/2019 | Noh | H04L 27/0006 |
| 2019/0306685 A1* | 10/2019 | Cariou | H04W 72/0446 |
| 2020/0196299 A1* | 6/2020 | Liu | H04W 52/0219 |
| 2020/0259599 A1* | 8/2020 | Zhang | H04L 1/1864 |
| 2021/0022154 A1* | 1/2021 | Cavalcanti | H04W 74/04 |
| 2023/0087687 A1* | 3/2023 | Lopez | H04W 74/006 370/329 |
| 2023/0137826 A1* | 5/2023 | Ajami | H04L 5/0098 370/329 |

OTHER PUBLICATIONS

Hu C (Facebook Inc)., et al., "Protected TWT Enhancement for Latency Sensitive Traffic", 11-20-1046-14-00BE—Prioritized EDCA Channel Access—Slot Management, IEEE-SA Mentor, Piscataway, NJ, USA, vol. 802.11 EHT, 802.11be, No. 14, Aug. 2020, pp. 1-22, Feb. 26, 2021, XP068178883, p. 7, pp. 8-9, 12.
International Search Report and Written Opinion—PCT/US2022/039878—ISA/EPO—dated Nov. 18, 2022.
Nezou P (Canon)., et al., "Low-Latency Triggered TWT", IEEE Draft, 11-20-1843-02-00BE-Low-Latency-Triggered-TWT, IEEE-SA Mentor, Piscataway, NJ USA, vol. 802.11 EHT, 802.11be, No. 2, Dec. 17, 2020, pp. 1-14, Dec. 16, 2020, XP068175533, pp. 2-5.

* cited by examiner

| TWT Request 1922 | TWT Setup Command 1924 | Trigger 1926 | Last Broadcast Parameter Set 1928 | Flow Type 1930 | Broadcast TWT Recommendation 1932 | TWT Wake Interval Exponent 1934 | Reserved 1936 |
|---|---|---|---|---|---|---|---|

*Figure 19C*

| Frame Control 2001 | Duration 2002 | RA 2003 | TA 2004 | Common Info 2005 | User Info 1 2006(1) | ... 2006(2) | User Info n 2006(n) | Padding 2007 | FCS 2008 |
|---|---|---|---|---|---|---|---|---|---|

*Figure 20A*

| AID12 2011 | RU Allocation 2012 | UL FEC Coding Type 2013 | UL HE-MCS 2014 | UL DCM 2015 | SS Allocation/ RA-RU Information 2016 | UL Target RSSI 2017 | Reserved 2018 | Trigger Dependent User Info 2019 |
|---|---|---|---|---|---|---|---|---|

*Figure 20B*

LOW LATENCY SCHEMES FOR PEER-TO-PEER (P2P) COMMUNICATIONS

TECHNICAL FIELD

This disclosure relates generally to wireless communication, and more specifically, to managing data traffic in restricted target wake time (TWT) service periods.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Thus, it is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication by an access point (AP). In some implementations, the method can include receiving a request frame from a wireless station (STA) associated with the AP and also associated with a client device via a peer-to-peer (P2P) link, the request frame indicating that the STA intends to exchange P2P communications with the client device during a restricted target wake time (r-TWT) service period (SP) scheduled on a wireless medium, the request frame identifying the client device. The method can include transmitting a response frame, responsive to receiving the request frame, on the wireless medium to the STA. The method can include obtaining a transmission opportunity (TXOP) on the wireless medium during the r-TWT SP. The method can include transmitting a trigger frame on the wireless medium responsive to obtaining the TXOP, the trigger frame allocating a portion of the obtained TXOP for P2P communications between the STA and the client device, where at least one of the response frame or the trigger frame indicates a Network Allocation Vector (NAV) exception for the client device. In some aspects, each of the response frame and the trigger frame includes a medium access control (MAC) address of the client device. In some implementations, the NAV exception indicates that the client device is to ignore a NAV duration indicated by the trigger frame and a NAV duration indicated by a clear-to-send (CTS) frame responsive to the trigger frame. In some aspects, the CTS frame includes the MAC address of the client device.

In some other implementations, the STA includes a collocated softAP configured to communicate with the client device, and at least one of the response frame or the trigger frame also indicates a NAV exception for the collocated softAP. In some instances, the NAV exception indicates that softAPs collocated with STAs belonging to the r-TWT SP are to ignore a NAV duration indicated by the trigger frame and a NAV duration indicated by the CTS frame responsive to the trigger frame. The request frame may indicate the MAC address of the collocated softAP to the AP, and each of the trigger frame and CTS frame may include the MAC address of the collocated softAP. In some aspects, the trigger frame includes a Carrier Sense (CS) Required field carrying a bit set to a value of 0 to indicate the NAV exception.

In various implementations, the request frame indicates the MAC address of the client device, and the response frame indicates that the client device is to ignore NAV durations set by trigger frames transmitted from the AP and NAV durations set by CTS frames responsive to the trigger frames. In some implementations, the request frame is a TWT request frame that includes a TWT Element indicating the MAC address of the client device. The TWT Element may indicate one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP. In some instances, the response frame may be a TWT response frame that includes a TWT Element indicating a set of TWT parameters to be used by participating devices for the r-TWT SP. In other implementations, the request frame is a Stream Classification Service (SCS) request frame that includes a traffic specification (TSPEC) Element indicating the MAC address of the client device. The TSPEC Element may also indicate a minimum data rate for the r-TWT SP, a mean data rate for the r-TWT SP, a delay bound for the r-TWT SP, and a user priority (UP) for the r-TWT SP. In some instances, the response frame may be an SCS response frame. In some other implementations, the request frame is a P2P request frame that includes one or more of a TWT Element, a TSPEC Element, or a vendor-specific information element (VSIE) that indicates at least the MAC address of the client device. The TWT Element may indicate various TWT parameters proposed for the r-TWT SP, and the P2P Element may indicate various P2P parameters proposed for the r-TWT SP. In some instances, the response frame may be a P2P response frame indicating how many devices are members of the r-TWT SP.

In some implementations, the trigger frame may be a multi-user (MU) Request-to-Send (RTS) TXOP Sharing (TXS) trigger frame that includes a TXOP sharing mode subfield indicating a TXOP sharing mode corresponding to the P2P communications associated with the client device. In some instances, the TXOP sharing mode subfield indicates a request for the STA to transmit, responsive to the MU-RTS TXS trigger frame, a CTS frame including a receiver address field containing the MAC address of the client device. In some other implementations, the request frame indicates a first time period during which the STA intends to use the wireless medium within the r-TWT SP, and the trigger frame includes a duration field indicating a second time period during which the portion of the TXOP is allocated for P2P communications associated with the client device, the second time period being shorter than the first time period. In some aspects, the second time period is based on a period of time associated with soliciting the CTS frame from the STA.

Another innovative aspect of the subject matter described in this disclosure can be implemented in a wireless communication device. The wireless communication device can include at least one modem, at least one processor communicatively coupled with the at least one modem, and at least one memory communicatively coupled with the at least one processor. In some implementations, the at least one memory stores processor-readable code that, when executed by the at least one processor in conjunction with the at least one modem, is configured to receive a request frame from a STA associated with the AP and also associated with a client device via a P2P link, the request frame indicating that the STA intends to exchange P2P communications with the client device during a r-TWT SP scheduled on a wireless medium, the request frame identifying the client device. Execution of the processor-readable code is configured to transmit a response frame, responsive to receiving the request frame, on the wireless medium to the STA. Execution of the processor-readable code is configured to obtain a TXOP on the wireless medium during the r-TWT SP. Execution of the processor-readable code is configured to transmit a trigger frame on the wireless medium responsive to obtaining the TXOP, the trigger frame allocating a portion of the obtained TXOP for P2P communications between the STA and the client device, where at least one of the response frame or the trigger frame includes a NAV exception for the client device.

In some implementations, each of the response frame and the trigger frame includes a MAC address of the client device. In some instances, the NAV exception indicates that the client device is to ignore a NAV duration indicated by the trigger frame and a NAV duration indicated by a CTS frame responsive to the trigger frame. In some aspects, the CTS frame indicate the MAC address of the client device.

In some other implementations, the STA includes a collocated softAP configured to communicate with the client device, and the at least one of the response frame or the trigger frame also indicates a NAV exception for the softAP. In some instances, the NAV exception indicates that softAPs collocated with STAs belonging to the r-TWT SP are to ignore a NAV duration indicated by the trigger frame and a NAV duration indicated by the CTS frame responsive to the trigger frame. The request frame may indicate the MAC address of the collocated softAP to the AP, and each of the trigger frame and CTS frame may include the MAC address of the collocated softAP. In some aspects, the trigger frame includes a Carrier Sense (CS) Required field carrying a bit set to a value of 0 to indicate the NAV exception.

In various implementations, the request frame indicates the MAC address of the client device, and the response frame indicates that the client device is to ignore NAV durations set by trigger frames transmitted from the AP and NAV durations set by CTS frames responsive to the trigger frames. In some implementations, the request frame is a TWT request frame that includes a TWT Element indicating the MAC address of the client device. The TWT Element may indicate one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP. In some instances, the response frame may be a TWT response frame that includes a TWT Element indicating a set of TWT parameters to be used by participating devices for the r-TWT SP. In other implementations, the request frame is a Stream Classification Service (SCS) request frame that includes a traffic specification (TSPEC) Element indicating the MAC address of the client device. The TSPEC Element may also indicate a minimum data rate for the r-TWT SP, a mean data rate for the r-TWT SP, a delay bound for the r-TWT SP, and a user priority (UP) for the r-TWT SP. In some instances, the response frame may be an SCS response frame. In some other implementations, the request frame is a P2P request frame that includes one or more of a TWT Element, a TSPEC Element, or a vendor-specific information element (VSIE) that indicates at least the MAC address of the client device. The TWT Element may indicate various TWT parameters proposed for the r-TWT SP, and the P2P Element may indicate various P2P parameters proposed for the r-TWT SP. In some instances, the response frame may be a P2P response frame indicating how many devices are members of the r-TWT SP.

In some implementations, the trigger frame may be a MU-RTS TXS trigger frame that includes a TXOP sharing mode subfield indicating a TXOP sharing mode corresponding to the P2P communications associated with the client device. In some instances, the TXOP sharing mode subfield indicates a request for the STA to transmit, responsive to the MU-RTS TXS trigger frame, a CTS frame including a receiver address field containing the MAC address of the client device. In some other implementations, the request frame indicates a first time period during which the STA intends to use the wireless medium within the r-TWT SP, and the trigger frame includes a duration field indicating a second time period during which the portion of the TXOP is allocated for P2P communications associated with the client device, the second time period being shorter than the first time period. In some aspects, the second time period is based on a period of time associated with soliciting the CTS frame from the STA.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 19C shows an example structure of a Request Type field in a Broadcast TWT Parameter Set field usable for wireless communications according to some implementations.

FIG. 20A shows an example structure of a trigger frame usable for wireless communications according to some implementations.

FIG. 20B shows an example structure of a User Info field of the trigger frame of FIG. 20A.

Like reference numbers and designations in the various drawings indicate like elements.

DETAILED DESCRIPTION

Figure 1:
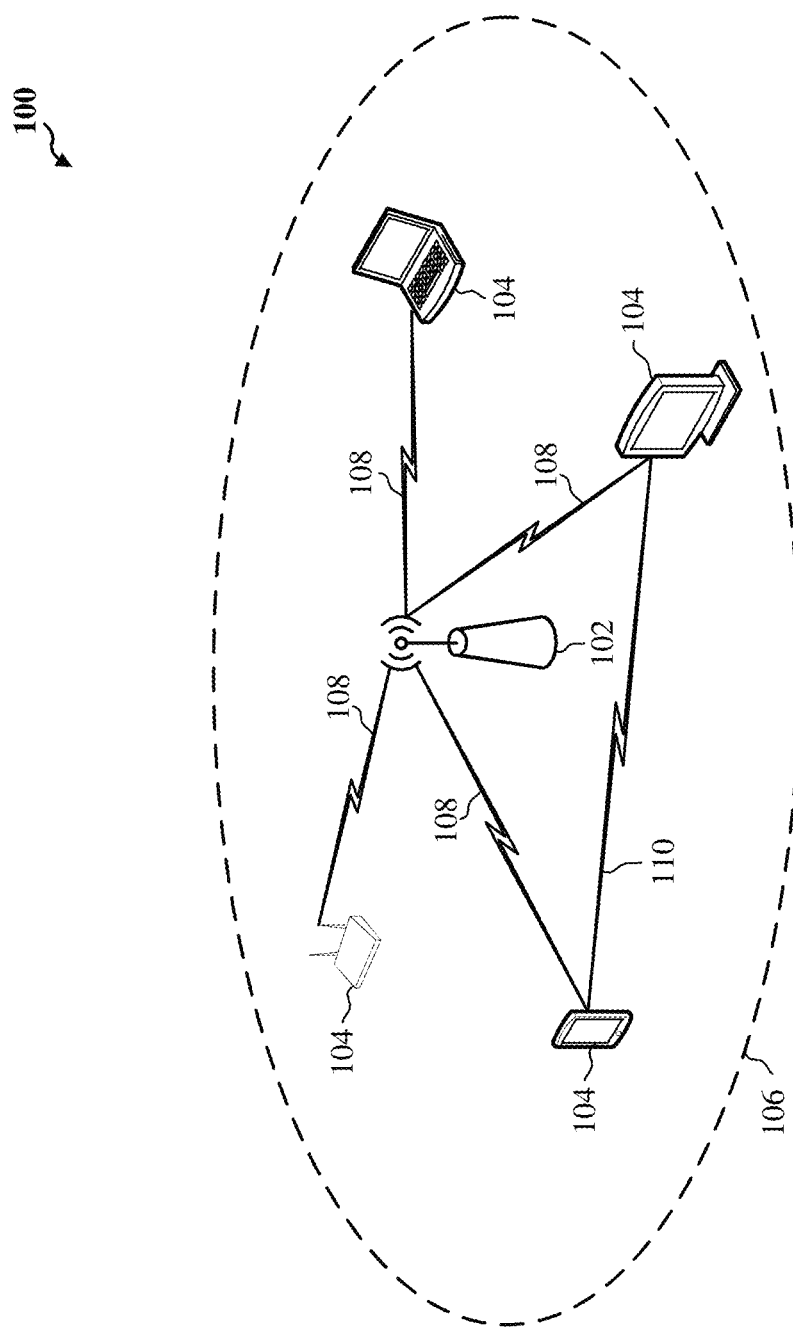
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Many wireless networks use random channel access mechanisms to control access to a shared wireless medium. In these wireless networks, wireless communication devices (including access points (APs) and wireless stations (STAs)) contend with one another using carrier sense multiple access with collision avoidance (CSMA/CA) techniques to gain access to the wireless medium. In general, the wireless communication device that randomly selects the lowest back-off number (RBO) wins the medium access contention operation and may be granted access to the wireless medium for a period of time commonly referred to as a transmit opportunity (TXOP). Other wireless communication devices are generally not permitted to transmit during the TXOP of another wireless communication device to avoid collisions on the shared wireless medium.

Some random channel access mechanisms, such as enhanced distributed channel access (EDCA), afford high-priority traffic a greater likelihood of gaining medium access than low-priority traffic. EDCA classifies data into different access categories (ACs) such as, for example, voice (AC_VO), video (AC VI), best effort (AC_BE), and background (AC_BK). Each AC is associated with a different priority level and may be assigned a different range of RBOs so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

The IEEE 802.11be amendment of the IEEE 802.11 standard describes a restricted target wake time (TWT) service period (SP) that can be used to provide more predictable latency, reduced worst case latency, or reduced jitter, with higher reliability for latency-sensitive traffic. As used herein, the term "non-legacy STA" may refer to any STA that supports restricted TWT operation, while the term "low-latency STA" may refer to any non-legacy STA that has latency-sensitive traffic to send or receive. In contrast, the term "legacy STA" may refer to any STA that does not support restricted TWT operation. The IEEE 802.11be amendment requires all non-legacy STAs that are TXOP holders outside of a restricted TWT SP to end their respective TXOPs before the start of any restricted TWT SP (r-TWT SP) for which they are not a member. Although membership in a r-TWT SP is reserved for low-latency STAs, the current rules regarding r-TWT SPs do not prevent non-member STAs from acquiring a TXOP during a r-TWT SP. As a result, some non-member STAs may gain access to a shared wireless medium, during a r-TWT SP, even before the members of the r-TWT SP are able to obtain channel access. Accordingly, new communication protocols and/or new channel protection mechanisms are needed to further protect latency-sensitive traffic associated with r-TWT SPs.

Various aspects relate generally to latency-sensitive communications, and more particularly, to ensuring that latency-sensitive traffic associated with r-TWT SPs is provided with sufficient channel access during r-TWT SPs to meet the various latency, throughput, and timing requirements of such latency-sensitive traffic. In some implementations, an AP may schedule a r-TWT SP on a wireless medium for low-latency STAs that have low-latency peer-to-peer (P2P) data to send or receive. In some instances, a STA associated with the AP may include a collocated softAP that is associated with a client device having low-latency P2P communications to transmit or receive. The softAP and its client device may be associated with a P2P link over which P2P communications can be exchanged between the softAP and the client device. Because neither the softAP nor the client device are associated with the AP, the AP may not identify the softAP or the client device in trigger frames transmitted over the wireless medium during the r-TWT SPs. As a result, when the STA intends to use the wireless medium for P2P communications associated with the softAP and the client device during a r-TWT SP, the softAP and client device may inadvertently set their respective NAVs to a duration indicated by the trigger frame, and therefore may not be able to transmit or receive P2P communications with each other during the r-TWT SP.

In some implementations, the AP may receive a request frame from a STA associated with the AP and affiliated with a client device via a P2P link. The request frame indicates that the STA intends to exchange P2P communications with the client device during a r-TWT SP scheduled on a wireless medium. The request frame identifies the client device, and may indicate one or more TWT parameters for the r-TWT SP. The AP may construct a Network Allocation Vector (NAV) exception for the client device based on information received in the request frame, and transmit a response frame to the STA. The AP may obtain a transmission opportunity (TXOP) on the wireless medium, and may transmit a trigger frame on the wireless medium during the r-TWT SP. The trigger frame may allocate a portion of the obtained TXOP for P2P communications between the STA and the client device. At least one of the response frame or the trigger frame indicates the NAV exception for the client device. In some instances, the NAV exception indicates that the client device is to ignore a NAV duration indicated by the trigger frame and a NAV duration indicated by a clear-to-send (CTS) frame responsive to the trigger frame. That is, the NAV exception may indicate that the client device is not to set its NAV based on NAV durations indicated by trigger frames transmitted during the r-TWT SP. In some instances, the STA may include a collocated softAP that has or can establish a P2P link with the client device. The NAV exception may also apply to the collocated softAP, for example, so that the collocated softAP does not set its NAV based on NAV durations indicated by trigger frames transmitted during the r-TWT SP.

Particular implementations of the subject matter described in this disclosure can be implemented to realize one or more of the following potential advantages. By signaling a NAV exception indicating that softAPs collocated or affiliated with STAs that are associated with the AP and belong to the r-TWT SP (as well as any associated P2P client devices) are not to set their respective NAVs to a duration indicated by a trigger frame transmitted from the AP during the r-TWT SP, aspects of the present disclosure may ensure that such softAPs and their associated client devices are able to exchange latency sensitive P2P communications with each other during scheduled portions of the r-TWT SP. In this way, implementations of the subject matter disclosed herein may ensure that latency sensitive traffic associated with P2P devices or P2P communications are provided with enhanced channel protection mechanisms.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
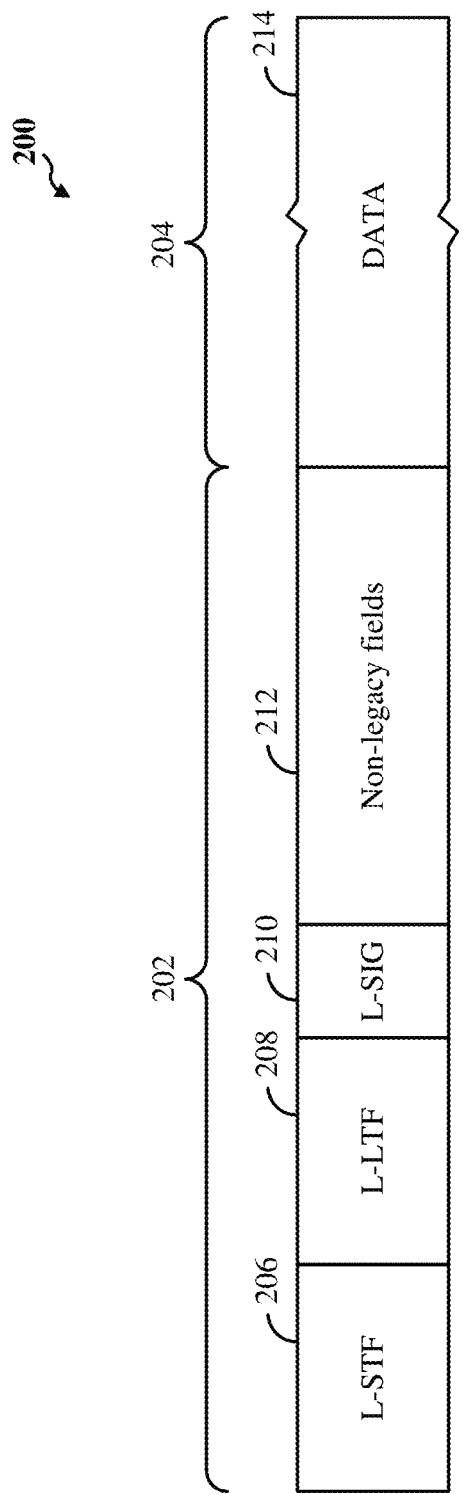
FIG. 2A shows an example protocol data unit (PDU) usable for communications between an access point (AP) and one or more wireless stations (STAs).

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MP-DUs).

Figure 2B:
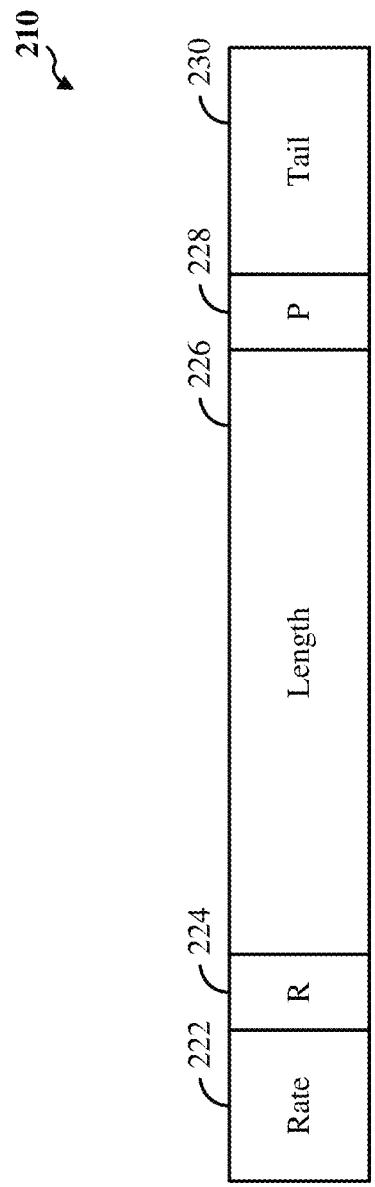
FIG. 2B shows an example field in the PDU of FIG. 2A.

FIG. 2B shows an example L-SIG field 220 in the PDU of FIG. 2A. The L-SIG 220 includes a data rate field 222, a reserved bit 224, a length field 226, a parity bit 228, and a tail field 220. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 220 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (μs).

Figure 3A:
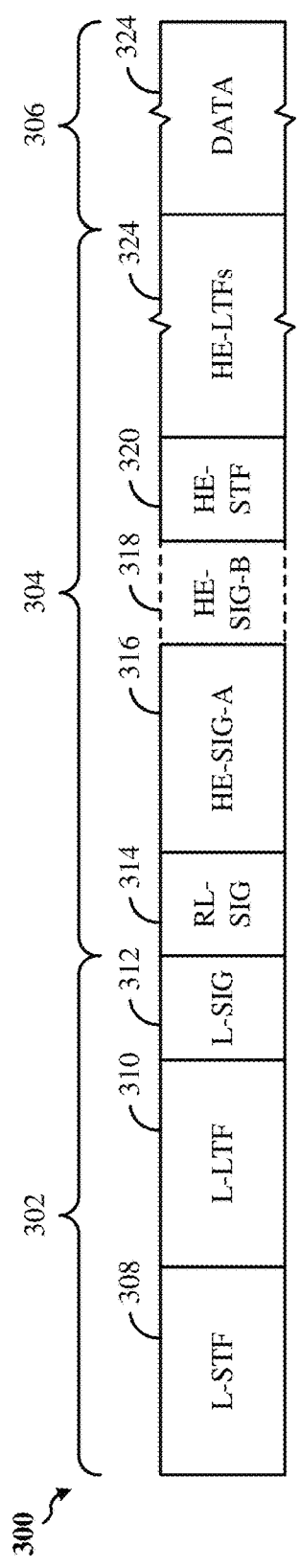
FIG. 3A shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
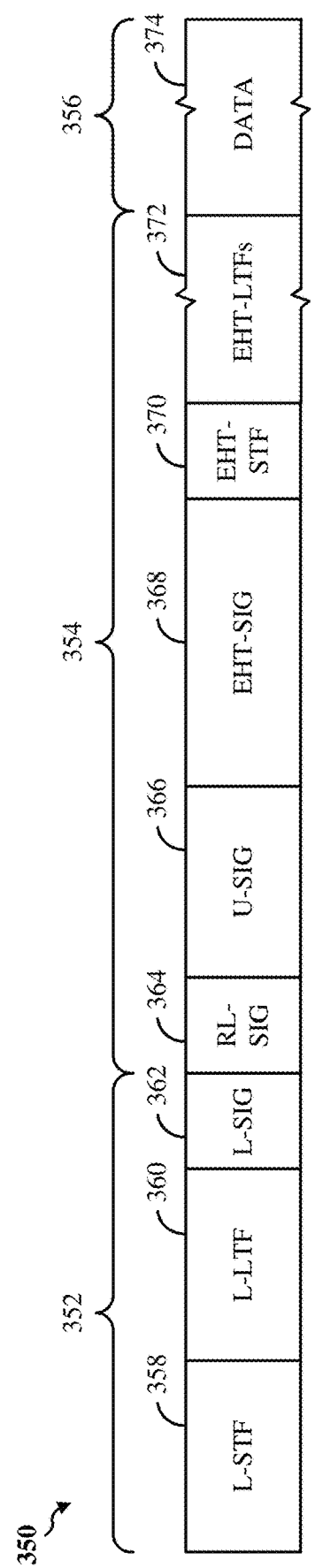
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
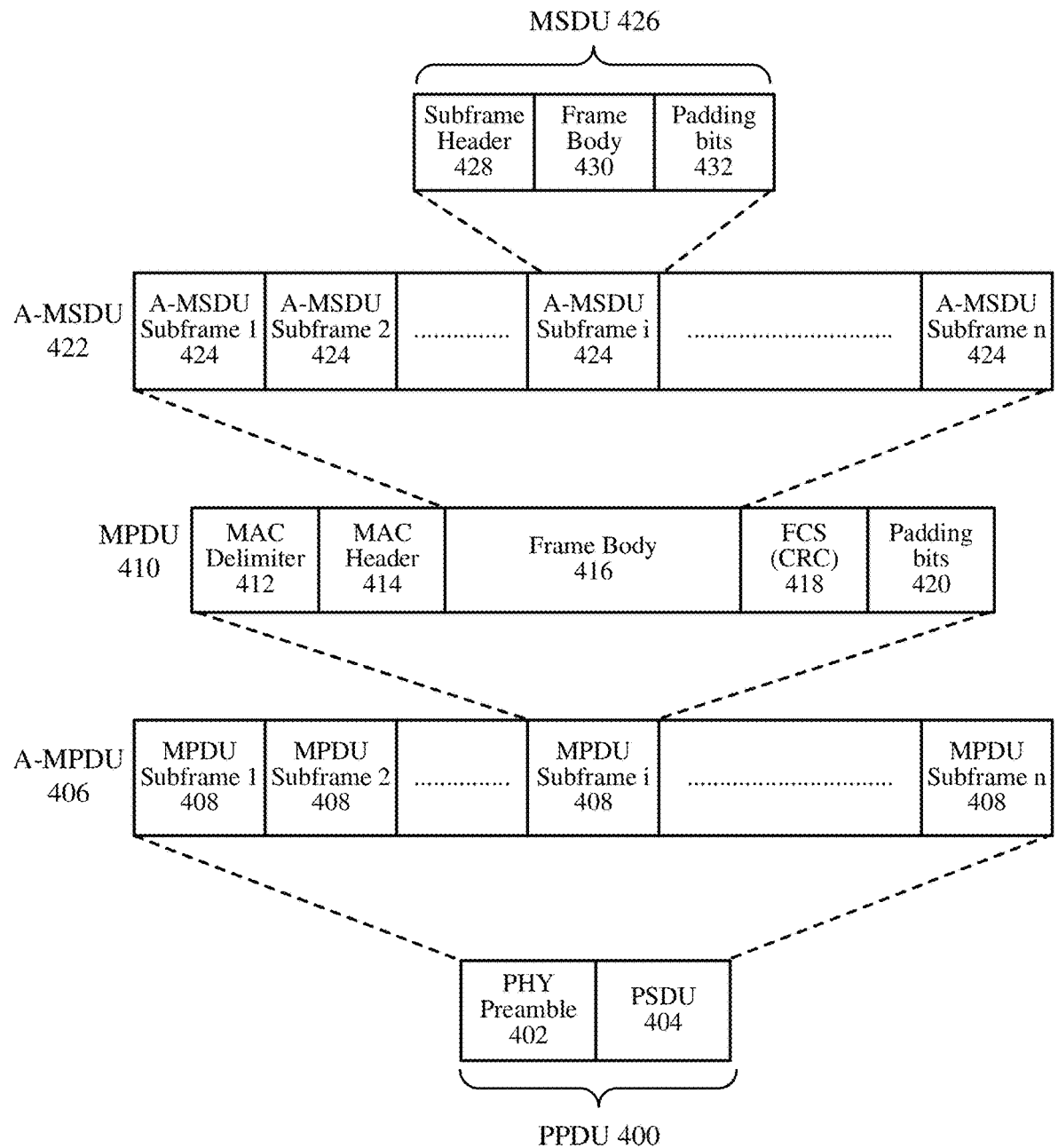
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 412 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 may also include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
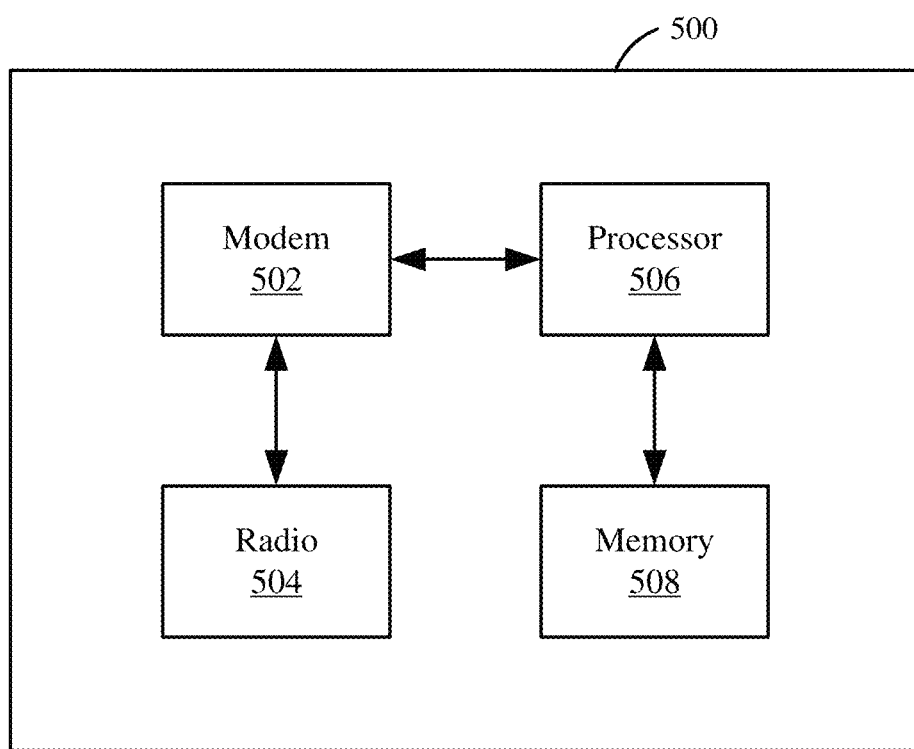
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements 506 (collectively "the processor 506"), and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
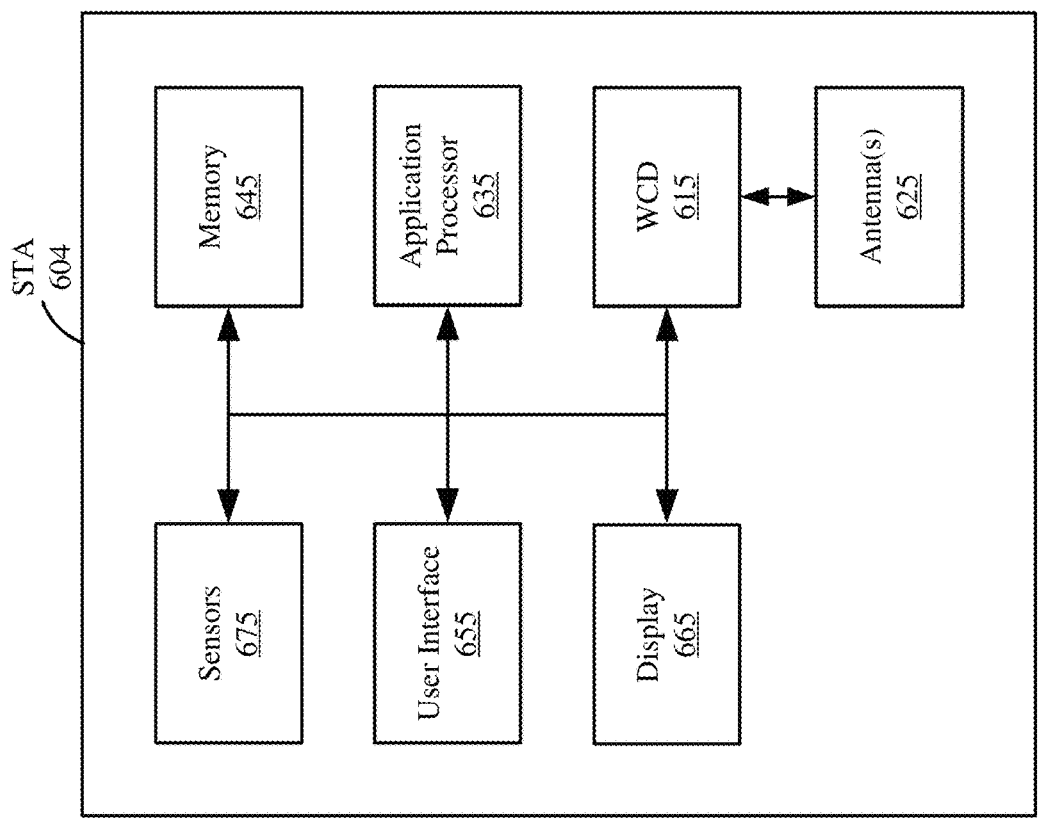
FIG. 6B shows a block diagram of an example station (STA).
Figure 6A:
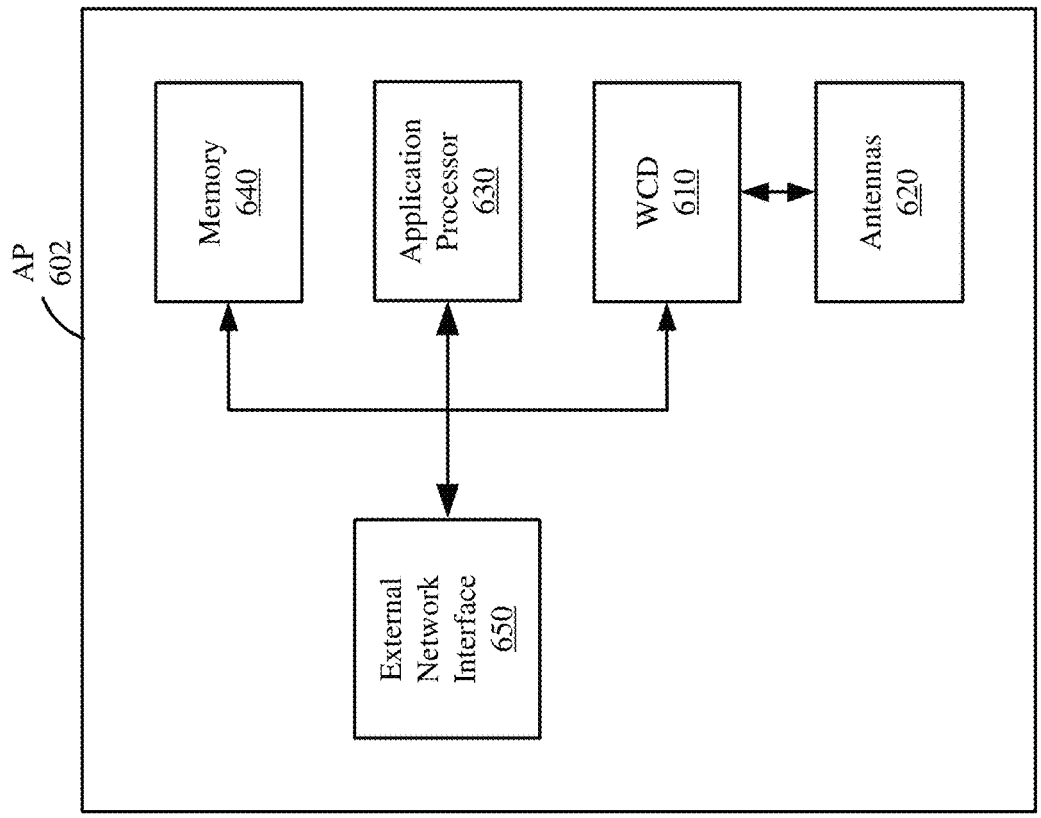
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As described above, the IEEE 802.11be amendment of the IEEE 802.11 standard describes an r-TWT SP that can be used to provide more predictable latency, reduced worst case latency, or reduced jitter, with higher reliability for latency-sensitive traffic. As used herein, the term "non-legacy STA" refers to any STA that supports the IEEE 802.11be amendment, or future generations, of the IEEE 802.11 standard, while the term "low-latency STA" refers to any non-legacy STA that has latency-sensitive traffic to send or receive. In contrast, the term "legacy STA" may refer to any STA that only supports the IEEE 802.11ax, or earlier generations, of the IEEE 802.11 standard. Non-legacy STAs that support r-TWT operation and are TXOP holders outside of an r-TWT SP must terminate their respective TXOPs before the start of any r-TWT SP for which they are not a member. Further, an AP may suppress traffic from all legacy STAs during an r-TWT SP by scheduling a quiet interval to overlap with the r-TWT SP. However, some non-legacy STAs may not support r-TWT operation may thus ignore the scheduling of quiet intervals and r-TWT SPs. In some instances, such non-legacy STAs may occupy a shared wireless medium at the start of an r-TWT SP, thereby blocking or delaying access to low-latency STAs that are members of the SP. Accordingly, new communication protocols or mechanisms are needed to further protect latency-sensitive traffic in r-TWT SPs.

Various aspects relate generally to latency-sensitive communications, and more particularly, to ensuring that latency-sensitive traffic associated with r-TWT SPs is provided with sufficient channel access during r-TWT SPs to meet the various latency, throughput, and timing requirements of such latency-sensitive traffic. In some implementations, an AP may schedule a r-TWT SP on a wireless medium for low-latency STAs that have low-latency peer-to-peer (P2P) data to send or receive. In some instances, a STA associated with the AP may include a collocated softAP that is associated with a client device having low-latency P2P communications to transmit or receive. The softAP and its client device may be associated with a P2P link over which P2P communications can be exchanged between the softAP and the client device. Because neither the softAP nor the client device are associated with the AP, the AP may not identify the softAP or the client device in trigger frames transmitted over the wireless medium during the r-TWT SPs. As a result, when the STA intends to use the wireless medium for P2P communications associated with the softAP and the client device during a r-TWT SP, the softAP and client device may inadvertently set their respective NAVs to a duration indicated by the trigger frame, and therefore may not be able to transmit or receive P2P communications with each other during the r-TWT SP.

In some implementations, the AP may receive a request frame from a STA associated with the AP and affiliated with a client device via a P2P link. The request frame indicates that the STA intends to exchange P2P communications with the client device during a r-TWT SP scheduled on a wireless medium. The request frame identifies the client device, and may indicate one or more TWT parameters for the r-TWT SP. The AP may construct a Network Allocation Vector (NAV) exception for the client device based on information received in the request frame, and transmit a response frame to the STA. The AP may obtain a transmission opportunity (TXOP) on the wireless medium, and may transmit a trigger frame on the wireless medium during the r-TWT SP. The trigger frame may allocate a portion of the obtained TXOP for P2P communications between the STA and the client device. At least one of the response frame or the trigger frame indicates the NAV exception for the client device. In some instances, the NAV exception indicates that the client device is to ignore a NAV duration indicated by the trigger frame and a NAV duration indicated by a clear-to-send (CTS) frame responsive to the trigger frame. That is, the NAV exception may indicate that the client device is not to set its NAV based on NAV durations indicated by trigger frames transmitted during the r-TWT SP. In some instances, the STA may include a collocated softAP that has or can establish a P2P link with the client device. The NAV exception may also apply to the collocated softAP, for example, so that the collocated softAP does not set its NAV based on NAV durations indicated by trigger frames transmitted during the r-TWT SP.

Particular implementations of the subject matter described in this disclosure can be implemented to realize one or more of the following potential advantages. By signaling a NAV exception indicating that softAPs collocated or affiliated with STAs that are associated with the AP and belong to the r-TWT SP (as well as any associated P2P client devices) are not to set their respective NAVs to a duration indicated by a trigger frame transmitted from the AP during the r-TWT SP, aspects of the present disclosure may ensure that such softAPs and their associated client devices are able to exchange latency sensitive P2P communications with each other during scheduled portions of the r-TWT SP. In this way, implementations of the subject matter disclosed herein may ensure that latency sensitive traffic associated with P2P devices or P2P communications are provided with enhanced channel protection mechanisms.

Figure 7:
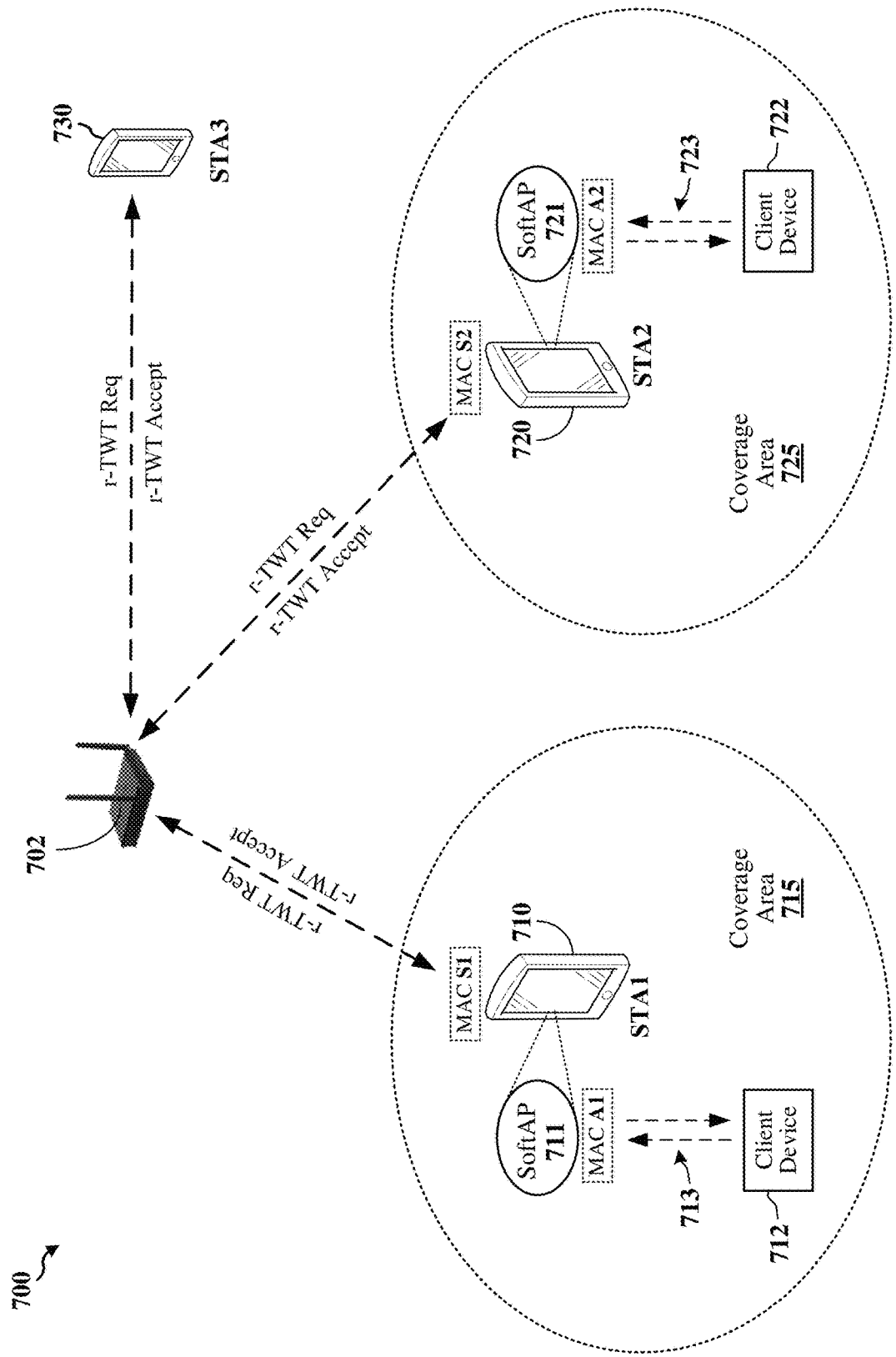
FIG. 7 shows a timing diagram depicting an example of wireless communication among devices belonging to a basic service set (BSS).

FIG. 7 shows a block diagram of another example wireless network 700, according to some implementations. In some aspects, the wireless network 700 can be an example of the WLAN 100 of FIG. 1. The wireless network 700 is shown to include an AP 702, a first wireless station (STA) 710, a second STA 720, and a third STA 730. In some implementations, the AP 702 may be one example of the AP 102 of FIG. 1 or the AP 602 of FIG. 6A, and may operate a BSS on a wireless medium according to one or more versions of the IEEE 802.11 family of wireless communication standards. The STAs 710, 720, and 730 may be examples of the STAs 104 of FIG. 1, the wireless communication device 500 of FIG. 5, or the STA 604 of FIG. 6B. The STAs 710, 720, and 730 are associated with the AP 702, and may communicate with the AP 702 on the wireless medium in accordance with the BSS operated by the AP 702.

In the example of FIG. 7, the first STA 710 is collocated with a first softAP 711 that is associated with a first client device 712, and the second STA 720 is collocated with a second softAP 721 that is associated with a second client device 722. The first softAP 711 and the first client device 712 may establish a P2P link 713 over which P2P communications can be exchanged between the first softAP 711 and client device 712. The second softAP 721 and the second client device 722 may establish a P2P link 723 over which P2P communications can be exchanged between the second softAP 721 and client device 722. In some instances, the P2P links 713 and 723 may be tunneled direct-link setup (TDLS) links established on the wireless medium. In other instances, the P2P links 713 and 723 may be based on the Wi-Fi Direct peer-to-peer communication protocol.

In some implementations, the first STA 710 includes separate MAC entities that can independently perform MAC layer functions for wireless communications with the AP 702 and MAC layer functions for wireless communications with the client device 712. For example, the first STA 710 may include a first MAC service access point (MAC-SAP) endpoint (S1) corresponding to the first STA 710, and may include a second MAC-SAP endpoint (A1) corresponding to the first softAP 711. The first MAC-SAP endpoint S1 may be responsible for decoding frames and packets received on the wireless medium from the AP 702, and may be responsible for constructing and formatting frames for transmission over the wireless medium from the first STA 710 to the AP 702. The second MAC-SAP endpoint A1 may be responsible for decoding frames and packets received on the wireless medium from the client device 712, and may be responsible for constructing and formatting frames for transmission from the first softAP 711 to the client device 712 over the first P2P link 713. In some instances, the MAC-SAP endpoints S1 and A1 may have different MAC addresses.

Similarly, the second STA 720 may include a first MAC service access point (MAC-SAP) endpoint (S2) corresponding to the second STA 720, and may include a second MAC-SAP endpoint (A2) corresponding to the second softAP 721. The first MAC-SAP endpoint S2 may be responsible for decoding frames and packets received on the wireless medium from the AP 702, and may be responsible for constructing and formatting frames for transmission over the wireless medium from the second STA 720 to the AP 702. The second MAC-SAP endpoint A2 may be responsible for decoding frames and packets received on the wireless medium from the client device 722, and may be responsible for constructing and formatting frames for transmission from the second softAP 721 to the client device 722 over the second P2P link 723. In some instances, the MAC-SAP endpoints S2 and A2 may have different MAC addresses.

The first STA 710 may provide a first coverage area 715 for P2P devices such as the first client device 712, and the second STA 720 may provide a second coverage area 725 for P2P devices such as the second client device 722. In some instances, the first and second coverage areas 715 and 725 may not overlap with each other (as depicted in the example of FIG. 7). In some other instances, the first and second coverage areas 715 and 725 may overlap with each other. Although not shown for simplicity, the coverage area provided by the AP 702 may include some or all of the first coverage area 715 provided by the first softAP 711 of the first STA 710, and may include some or all of the second coverage area 725 provided by the second softAP 721 of the second STA 720. For example, in some instances, one or both of the client devices 712 and 722 may be able to receive and successfully decode frames transmitted by the AP 702, while in other instances, one or both of the client devices 712 and 722 may not be able to receive and successfully decode frames transmitted by the AP 702 (such as because the client devices 712 and 722 are not within the wireless coverage area of the AP 702).

The client devices 712 and 722 can be any suitable devices that can establish P2P links with respective softAPs 711 and 721. In the example of FIG. 7, the client devices 712 and 722 are associated with low-latency applications having strict end-to-end latency, throughput, and timing requirements for data traffic. In some instances, the client devices 712 and 722 may be associated with real-time gaming applications, video communications, or augmented reality (AR) and virtual reality (VR) applications (collectively referred to as extended reality (XR) applications). For example, the client devices 712 and 722 may be VR headsets associated with the softAPs 711 and 721 collocated with the first and second STAs 710 and 720, respectively. As such, each of the first STA 710 and the second STA 720 may be referred to as a low-latency STA. In instances for which the third STA 730 is associated with latency sensitive traffic, the third STA 730 may also be referred to as a low-latency STA.

As discussed, low-latency applications may specify various latency, throughput, and timing requirements for the WLAN 700, and therefore it is desirable to ensure that the WLAN 700 is able to meet the various latency, throughput, and timing requirements of such low-latency applications. In some implementations, each of the low-latency STAs 710, 720, and 730 can request the AP 702 to schedule a r-TWT SP by sending a corresponding r-TWT REQ frame to the AP 702 over the wireless medium. Each of the r-TWT REQ frames may include the MAC address of the AP 702, the MAC address of the respective STA, and one or more TWT parameters. In some aspects, the one or more TWT parameters may include (but are not limited to) a periodicity of the requested r-TWT SP, a duration of the requested r-TWT SP, a sharing mode of the requested r-TWT SP, a wake duration of the requested r-TWT SP, a flow type of the requested r-TWT SP, a parameter set of the r-TWT SP, or an intention of the respective STA to use the r-TWT SP for P2P communications between the respective STA and an associated client device.

After receiving the r-TWT SP REQs, the AP 702 may determine whether to accept, decline, or modify the TWT parameters proposed by each the STAs 710, 720, and 730. Specifically, the AP 702 sends a r-TWT SP accept frame to each of the first, second, and third STAs 710, 720, and 730. Each r-TWT SP accept frame may include the MAC address of the corresponding STA and a set of TWT parameters to be used for r-TWT SPs scheduled on the wireless medium. In some instances, the AP 702 may accept the TWT parameters proposed by a respective STA, and thus the set of TWT parameters carried in the corresponding r-TWT SP accept frame may be the same as the proposed TWT parameters. In other instances, the AP 702 may propose new or modified TWT parameters to a respective STA, and thus the set of TWT parameters carried in the corresponding r-TWT SP accept frame may be different than the proposed TWT parameters. In some other instances, the AP 702 may decline the TWT parameters or the r-TWT SP requested by one or more of the STAs 710, 720, or 730.

Figure 8:
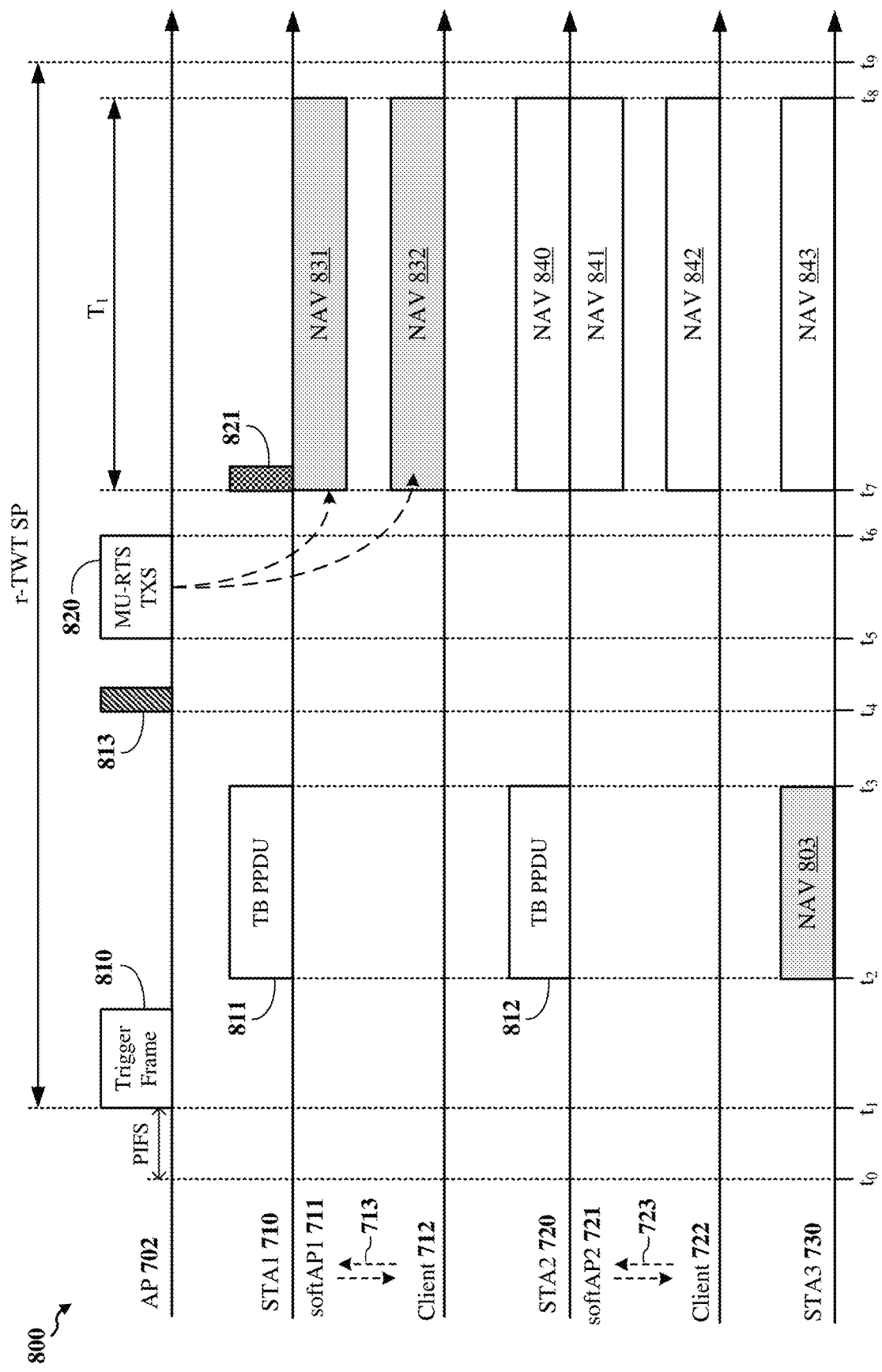
FIG. 8 shows a timing diagram depicting another example of wireless communication that supports latency sensitive traffic according to some implementations.

FIG. 8 shows a timing diagram 800 depicting an example wireless communication among devices belonging to a BSS. The BSS is shown to include the AP 702, the first STA 710 and a collocated first softAP 711, the first client device 712, the second STA 720 and a collocated second softAP 721, the second client device 722, and the third STA 730 described with reference to FIG. 7. In some implementations, each of the first, second, and third STAs 710, 720, and 730 may be referred to as low-latency STAs. In the example of FIG. 8, the first and second STAs 710 and 720 may be members of a scheduled r-TWT SP, which spans a time period between times $t_1$ and $t_9$, whereas the third STA 730 is not a member of the r-TWT SP (and may thus be referred to as a "non-member STA").

As discussed with reference to FIG. 7, the first STA 710 is associated with the AP 702, and implements or operates the first softAP 711 that is associated with the first client device 712 via a first P2P link 713. Similarly, the STA 720 operates is associated with the AP 702, and implements or operates the second softAP 721 that is associated with the second client device 722 via a second P2P link 723. In some implementations, the first STA 710 may include two MAC-softAP endpoints S1 and A1, and the second STA 720 may include two MAC-softAP endpoints S2 and A2. The third STA 730 is associated with the AP 702, and does not implement or operate a softAP. Although only three STAs are shown in the example of FIG. 8, in actual implementations, the BSS may include any number of STAs (such as low-latency STAs), and may also include any number of non-legacy STAs.

As discussed, the existing rules regarding restricted TWT operation require non-member STAs to terminate their TXOPs by the start of a restricted TWT SP. The restricted TWT SP of FIG. 8 starts at time $t_1$, and thus all non-member STAs (such as the third STA 730) truncate their respective TXOPs, if any, by time $t_1$. In some instances, the AP 702 may suppress traffic from all legacy STAs associated with the BSS by scheduling a quiet interval to overlap with the restricted TWT SP. For example, the duration of the quiet interval may be indicated by one or more Quiet Elements included in management frames (such as beacon frames and probe response frames) transmitted by the AP 702 prior to the start of the restricted TWT SP.

As shown, the AP 702 attempts to access a shared wireless medium prior to the start of the r-TWT SP. More specifically, the AP 702 senses that the medium is idle for at least a SIFS duration, from times $t_0$ to $t_1$, based on a channel sensing operation (such as clear channel assessment (CCA)) before attempting to acquire a TXOP. In some instances, the AP 702 may sense the wireless medium is idle for a PIFS duration before attempting to gain channel access (such that the period of time from times $t_0$ to $t_1$ is a PIFS duration). At time $t_1$, the AP 702 senses that the wireless medium is still idle and proceeds to acquire a TXOP, for example, by initiating a transmission over the shared medium. Specifically, the AP 702 transmits, on the wireless medium, a trigger frame 810 that identifies the first STA 710 and the second STA 720 for a triggered-based uplink (UL) transmission. In some instances, the trigger frame 810 includes Per User Info fields that carry the association identifiers (AIDs) assigned to the first and second STAs 710 and 720.

In some implementations, the trigger frame 810 includes a duration field (in the MAC header) that can be used to protect latency-sensitive traffic in the restricted TWT SP. As described, STAs that conform to existing versions of the IEEE 802.11 standard must defer medium access for at least the duration indicated by the duration field in a trigger frame (such as the trigger frame 810). In some implementations, the duration indicated by the duration field may be greater than a duration needed to transmit the trigger frame 810. For example, as shown in FIG. 8, the third STA 730 may set its NAV 803 to the duration indicated by the duration field of the trigger frame 810, which spans a time period between times $t_2$ and $t_3$. In this way, the AP 702 may protect low-latency traffic communicated using the WLAN 700 from non-triggered STAs.

In some other implementations, the AP 702 may poll the low-latency STAs, prior to the start of the restricted TWT SP, to determine which (if any) of the STAs have UL data to send. For example, the AP 702 may transmit a buffer status report poll (BSRP) trigger frame to the low-latency STAs associated with the restricted TWT SP. Each low-latency STA responds to the BSRP trigger frame by transmitting, to the AP 702, a buffer status report (BSR) indicating the amount of UL data buffered by the STA. The AP 702 may use the information carried in each BSR to determine a resource allocation for TB PPDUs solicited by trigger frames (such as the trigger frame 810).

The first and second STAs 710 and 720 receive the trigger frame 810, and determine that their respective AID values match the AID values carried in the trigger frame 810. Between times $t_2$ and $t_3$, the first STA 710 transmits a first trigger-based (TB) physical layer convergence protocol (PLCP) protocol data unit (PPDU) 811 over the wireless medium to the AP 702, and the second STA 720 transmits a second TB PPDU 812 over the wireless medium to the AP 702. In some instances, the first and second TB PPDUs 811 and 812 may be transmitted as an MU UL PPDU. The AP 702 receives the TB PPDUs 811 and 812, and acknowledges their reception by transmitting a block ACK frame 813 over the wireless medium to the first and second STAs 710 and 720 at time $t_4$.

At time $t_5$, the AP 702 obtains a TXOP, and transmits a multi-user (MU) Request-to-Send (RTS) TXOP Sharing (TXS) trigger frame 820 over the wireless medium. In some implementations, the MU-RTS TXS trigger frame 820 includes a duration field indicating the duration of the obtained TXOP, for example, so that non-triggered STAs set their NAVs to the duration indicated in the duration field. In the example of FIG. 8, the MU-RTS TXS trigger frame 820 may allocate a portion ($T_1$) of the TXOP obtained by the AP 702 to the first STA 710 during the r-TWT SP. Specifically, the MU-RTS TXS trigger frame 820 may include the MAC address of STA, and may also include the AID value of the first STA 710 (for example, to solicit one or more TB PPDUs from the first STA 710).

As discussed, the first STA 710 is collocated with a softAP linked to a first client device 712 associated with latency sensitive traffic. In the example of FIG. 8, the first STA 710 intends to use the allocated portion of the TXOP to facilitate P2P communications between the collocated softAP and the first client device 712. However, the AP 702 may not be aware that the first STA 710 is collocated with a softAP, and thus may not be aware that the first STA 710 intends to allow its collocated softAP and the first client device 712 to exchange P2P communications over the wireless medium during the allocated portion of the TXOP. Specifically, although the MU-RTS TXS trigger frame 820 may include the MAC address of the first STA 710, the MU-RTS TXS trigger frame 820 may not include the MAC address of the first softAP 711 or the MAC address of the associated client device 712. Because neither the softAP nor its associated client device 712 are identified by the MU-RTS TXS trigger frame 820, both the softAP and client device 712 may set their respective NAVs 831 and 832 to the duration indicated in the duration field of the MU-RTS TXS trigger frame 820. As a result, neither the first softAP 711 nor the client device 712 may be able to transmit or receive P2P communications to or from the first softAP 711 during the allocated portion of the TXOP.

The first STA 710 receives the MU-RTS TXS trigger frame 820, determines that its AID is carried in the MU-RTS TXS trigger frame 820, and determines that a portion of the TXOP is allocated to the first STA 710. The first STA 710 acknowledges reception of the MU-RTS TXS trigger frame 820 by transmitting a CTS frame 821 to the AP 702 at time $t_7$. The CTS frame 821 may include the MAC address of the AP 702, for example, so that the AP 702 can determine that the CTS frame 821 is acknowledging reception of the MU-RTS TXS trigger frame 820. However, because neither the softAP nor its associated client device 712 are identified by the CTS frame 821, the first softAP 711 and client device 712 may set their respective NAVs 831 and 832 to the duration indicated in the duration field of the CTS frame 821 (unless they have already set their respective NAVs based on the duration indicated in the MU-RTS TXS trigger frame 820). As such, neither the first softAP 711 nor the client device 712 may be able to transmit or receive P2P communications to or from each other during the allocated portion of the TXOP. Similarly, because neither the MU-RTS TXS trigger frame 820 nor the CTS frame 821 address or otherwise identify the second STA 720, a second collocated softAP 721, or client device 722 for using the allocated portion of the TXOP, each of the second STA 720, the second softAP 721, and client device 722 set their respective NAVs 840, 841, and 842 to the duration indicated in the CTS frame 821. The third STA 730 also determines that it is not identified by the MU-RTS TXS trigger frame 820, and sets its NAV 843 to the duration indicated in the duration field of the MU-RTS TXS trigger frame 820 or the CTS frame 821.

Figure 9:
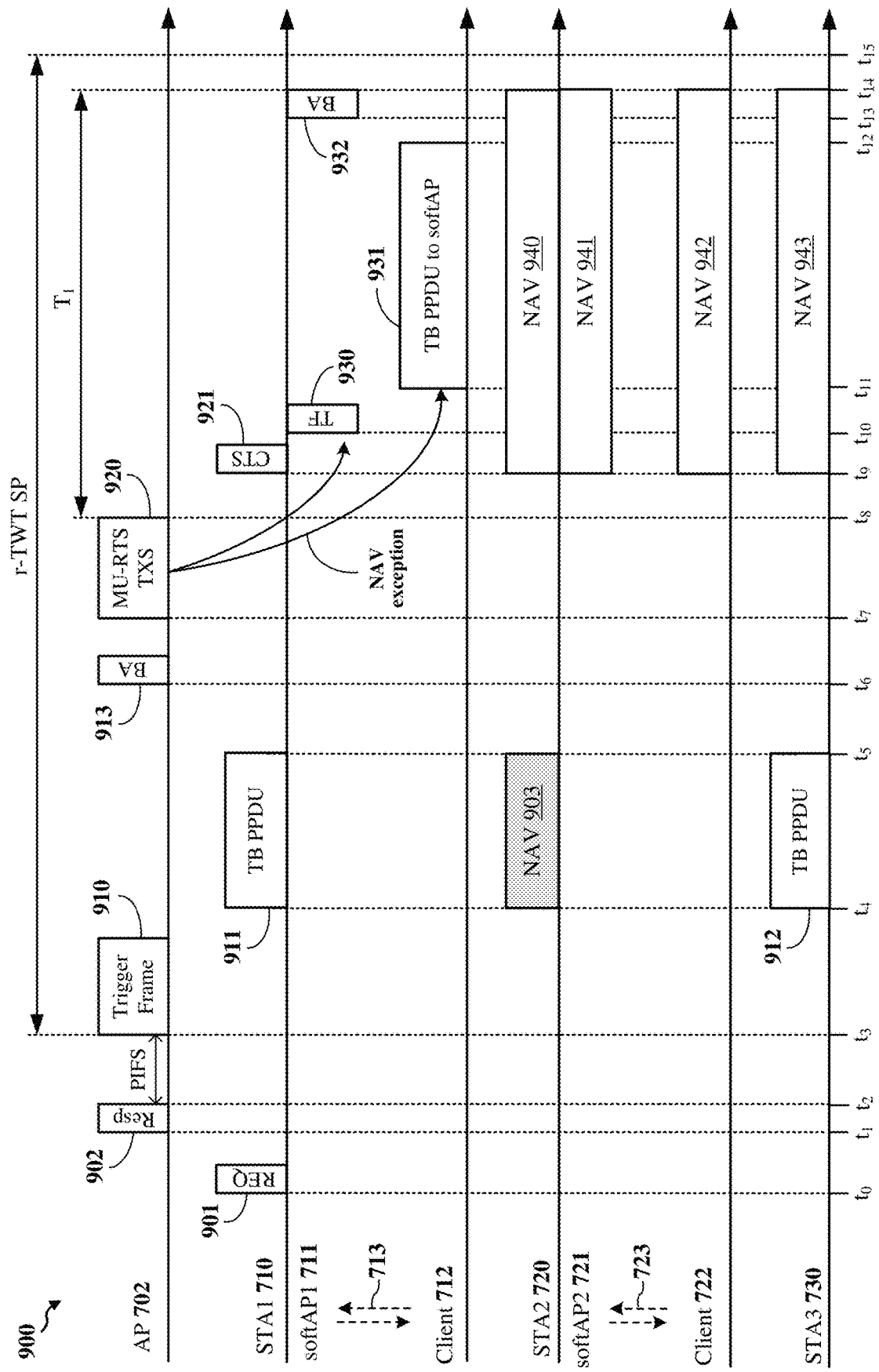
FIG. 9 shows a timing diagram depicting another example of wireless communication that supports latency sensitive traffic according to some implementations.

FIG. 9 shows a timing diagram depicting an example wireless communication 900 among devices belonging to a BSS, according to some implementations. The BSS is shown to include the AP 702, the first STA 710, the second STA 720, and the third STA 730 described with reference to FIG. 7. In the example of FIG. 9, the first and second STAs 710 and 720 are members of a scheduled r-TWT SP, which spans a time period between times $t_3$ and $t_{15}$, whereas the third STA 730 is not a member of the r-TWT SP (and may thus be referred to as a "non-member STA"). As discussed, the first STA 710 is associated with the AP 702, and implements or operates a first collocated softAP 711 that has or can establish a P2P link 713 with the first client device 712. Similarly, the second STA 720 is associated with the AP 702, and implements or operates a second collocated softAP 721 that has or can establish a P2P link 723 with the second client device 722. Although only three low-latency STAs are shown in the example of FIG. 9, in actual implementations, the BSS may include any number of low-latency STAs, and may also include any number of non-legacy STAs.

In the example of FIG. 9, the first STA 710 requests a r-TWT SP for P2P communications between its collocated first softAP 711 and client device 712. Specifically, at time to, the first STA 710 transmits a request (REQ) frame 901 over the wireless medium to the AP 702. The request frame 901 may include a request for the AP 702 to schedule, for the first STA 710, a r-TWT SP during which the first softAP 711 can use the wireless medium to transmit or receive low-latency data to or from client device 712. In some instances, the request frame 901 identifies the softAP and its client device 712 as participants in a communication exchange scheduled during the r-TWT SP. For example, in some aspects, the request frame 901 may include the MAC addresses of the softAP and the client device 712. The AP 702 can use the MAC addresses, or other suitable identifiers, of the softAP and client device 712 to provide an enhanced protection mechanism for P2P communications exchanged over the wireless medium during the r-TWT SP. In some implementations, the request frame 901 may include a TWT Element that carries the MAC address of the client device 712. The TWT Element may also carry one or more TWT parameters associated with the r-TWT SP. Example TWT parameters may include (but are not limited to) a periodicity of the r-TWT SP, a duration of the r-TWT SP, a sharing mode of the r-TWT SP, a wake duration of the r-TWT SP, a flow type of the r-TWT SP, a parameter set of the r-TWT SP, or the intention of the soft AP to use the wireless medium during the r-TWT SP.

Between times $t_0$ and $t_1$, the AP 702 decodes the request frame 901, and obtains the TWT parameters associated with the r-TWT SP requested by the first STA 710. The AP 702 may also determine which devices intend to use the wireless medium for P2P communications during a portion of the r-TWT SP. In some implementations, the AP 702 may use information decoded from the request frame 901 to construct a NAV exception for P2P communications associated with softAPs that are collocated with STAs belonging to the r-TWT SP. Specifically, in some instances, the NAV exception may identify one or more devices associated with the AP 702 or the collocated softAP that are to ignore NAV durations indicated by MU-RTS TXS trigger frames and NAV durations indicated by CTS frames that follow the MU-RTS TXS trigger frames. In the example of FIG. 9, the NAV exception may indicate that the first softAP 711 and client device 712 are to ignore NAV durations indicated by MU-RTS TXS trigger frames subsequently transmitted from the AP 702 and any CTS frames transmitted in response to the subsequently transmitted MU-RTS TXS trigger frames. As a result, while the first softAP 711 and client device 712 do not set their respective NAVs based on the duration indicated in the duration field of an MU-RTS TXS trigger frame (or the CTS frame that follows), other wireless communication devices that are not members of the r-TWT SP or not identified by a MU-RTS TXS trigger frame set their respective NAVs based on the duration indicated by the MU-RTS TXS trigger frame (or the CTS frame that follows).

The AP 702 transmits a response (Resp) frame 902 on the wireless medium to the first STA 710, between times $t_1$ and $t_2$. The response frame 902 may include a TWT Element carrying a set of TWT parameters for the scheduled r-TWT SP. In some implementations, the response frame 902 may also include the MAC addresses of softAP1 and client device 712. In some other implementations, the response frame 902 may also indicate how many wireless communication devices are members of the scheduled r-TWT SP. In some instances, this allows the first STA 710 to determine whether it is the only member of the r-TWT SP, and thus whether it can use aggressive channel access techniques, rather than MU-RTS TXS trigger frames, during the r-TWT SP.

The AP 702 senses that the wireless medium is idle for a PIFS duration, from times $t_2$ to $t_3$, based on a channel sensing operation (such as clear channel assessment (CCA)) before attempting to acquire a TXOP. At time $t_3$, the AP 702 senses that the wireless medium is still idle and proceeds to acquire a TXOP, for example, by initiating a transmission on the shared medium. Specifically, the AP 702 transmits a trigger frame 910 on the wireless medium at time $t_3$. In the example of FIG. 9, the trigger frame 910 identifies the first STA 710 and the third STA 730, for example, by including the AIDs of the first STA 710 and the third STA 730 in respective User Info fields of the trigger frame 910.

The first STA 710 and the third STA 730 receive the trigger frame 910, and determine that their respective AIDs match the AIDs carried in the trigger frame 910. Between times $t_4$ and $t_5$, the first STA 710 transmits a first TB PPDU 911 over the wireless medium to the AP 702, and the second STA 720 transmits a second TB PPDU 912 over the wireless medium to the AP 702. In some instances, the first and second TB PPDUs 911 and 912 may be transmitted as an MU UL PPDU. The AP 702 receives the TB PPDUs 911 and 912, and acknowledges their reception by transmitting a block ACK frame 913 over the wireless medium to the first and second STAs 710 and 720 at time $t_6$.

The second STA 720 receives the trigger frame 910, and determines that it is not identified for UL transmissions by the trigger frame 910. As such, the second STA 720 sets its NAV 903 to the duration field of the trigger frame 910. In some instances, the duration indicated in the trigger frame 910 may correspond to a period of time associated with transmission of a TB PPDU over the wireless medium. For example, as shown in FIG. 9, the second STA 720 may set its NAV 903 to the duration indicated by the duration field of the trigger frame 910, which spans a time period between times $t_4$ and $t_5$. In this way, the AP 702 may protect low-latency traffic communicated using the WLAN 700 from at least nearby STAs.

At time $t_7$, which may be a SIFS duration after an end of the transmission of the block ACK frame 913, the AP 702 obtains a TXOP, and transmits a MU-RTS TXS trigger frame 920 over the wireless medium between times $t_7$ and $t_8$. The MU-RTS TXS trigger frame 920 allocates a portion of the TXOP obtained by the AP 702 for P2P communications between the client device 712 and the first softAP 711 during the r-TWT SP. The MU-RTS TXS trigger frame 920 includes a duration field indicating a duration of time ($T_1$) for which the TXOP is allocated for P2P communications. In this way, receiving devices not identified by the MU-RTS TXS trigger frame 920 set their respective NAVs to the indicated duration of time $T_1$, for example, so that low-latency P2P communications between the client device 712 and the first softAP 711 are not interrupted or degraded.

In various implementations, the MU-RTS TXS trigger frame 920 signals a NAV exception indicating that the first softAP 711 and client device 712 are to ignore NAV durations indicated by the MU-RTS TXS trigger frame 920 or NAV durations indicated by CTS frames that follow the MU-RTS TXS trigger frame 920. In some aspects, the MU-RTS TXS trigger frame 920 may include or indicate the MAC addresses of the first softAP 711 and client device 712, for example, so that the first softAP 711 and client device 712 receive and decode the MU-RTS TXS trigger frame 920.

The first STA 710 receives and decodes the MU-RTS TXS trigger frame 920 between times $t_8$ and $t_9$, and determines that a portion of the TXOP is allocated for P2P communications associated with the client device 712. At time $t_9$, the first STA 710 acknowledges reception of the MU-RTS TXS trigger frame 920 by transmitting a CTS frame 921 to the AP 702. The CTS frame 921 includes a duration field indicating the duration of time ($T_1$) for which the TXOP is allocated for P2P communications. In this way, receiving devices that receive the CTS frame, but do not receive the MU-RTS TXS trigger frame 920, can set their respective NAVs to the indicated duration of time $T_1$. In some instances, the CTS frame 921 signals the NAV exception described with reference to the MU-RTS TXS trigger frame 920, and also indicates the MAC addresses of the client device 712 and the first softAP 711, for example, so that the first softAP 711 and client device 712 receive and decode the CTS frame 921.

The client device 712 and the first softAP 711 may receive and decode the MU-RTS TXS trigger frame 920, between times $t_8$ and $t_9$. Specifically, the client device 712 and the first softAP 711 may decode the NAV exception signaled by the MU-RTS TXS trigger frame 920, and in response to the NAV exception, do not set their respective NAVs to the duration indicated in the duration field of the MU-RTS TXS trigger frame 920. In some instances, the client device 712 and the first softAP 711 may also receive and decode the CTS frame 921 transmitted by the first STA 710. For example, the client device 712 and the first softAP 711 may decode the NAV exception signaled by the CTS frame 921, and in response to the NAV exception, do not set their respective NAVs to the duration indicated in the duration field of the CTS frame 921. Thus, if the client device 712 does not receive or cannot decode the MU-RTS TXS trigger frame 920 (such as because the client device 712 is outside the wireless coverage area of the AP 702), the client device 712 can obtain the NAV exception from the CTS frame 921 transmitted by the first STA 710. In this way, implementations of the subject matter disclosed herein may ensure that the client device 712, as well as the first softAP 711, can obtain the NAV exception and remain available to exchange P2P communications with each other during the allocated portion of the TXOP, for example, by not setting their respective NAVs to the duration indicated by the MU-RTS TXS trigger frame 920.

At time $t_{10}$, the first softAP 711 senses that the wireless medium is idle, and transmits a trigger frame 930 on the wireless medium to the client device 712. In the example of FIG. 9, the trigger frame 930 identifies the client device 712, for example, by including the MAC address (or another suitable identifier) in a User Info field included in the trigger frame 930.

The client device 712 receives the trigger frame 930, and determines that the trigger frame 930 identifies the client device 712. In some instances, the trigger frame 930 may solicit UL P2P transmissions from the client device 712. In response to the trigger frame 930, the client device 712 transmits a TB PPDU 931 on the wireless medium to the first softAP 711 between times $t_{11}$ and $t_{12}$. The first softAP 711 receives the TB PPDU 931, and acknowledges reception of the TB PPDU 931 by transmitting a block ACK frame 932 to the client device 712 between times $t_{13}$ and $t_{14}$. Allocation of the TXOP to the first STA 710 ends at time $t_{14}$. The NAVs of the second STA 720, its collocated softAP 721, the second client device 722, and the third STA 730 also end at time $t_{14}$. The r-TWT SP ends at time $t_{15}$.

In some instances, the P2P link 713 may be established using a Wi-Fi Tunneled Direct Link Setup (TDLS). In other instances, the P2P link 713 may be a W-Fi Direct connection. In some other instances, the first STA 710 or the first softAP 711 may be a group owner (GO) and coordinate P2P transmissions to or from the client device 712. In some instances, the NAV exceptions may be included or indicated by the TWT Element carried in the P2P response frame 902. In some other instances, the NAV exceptions may be included or indicated by other suitable signaling within or associated with the P2P response frame 902.

Figure 10:
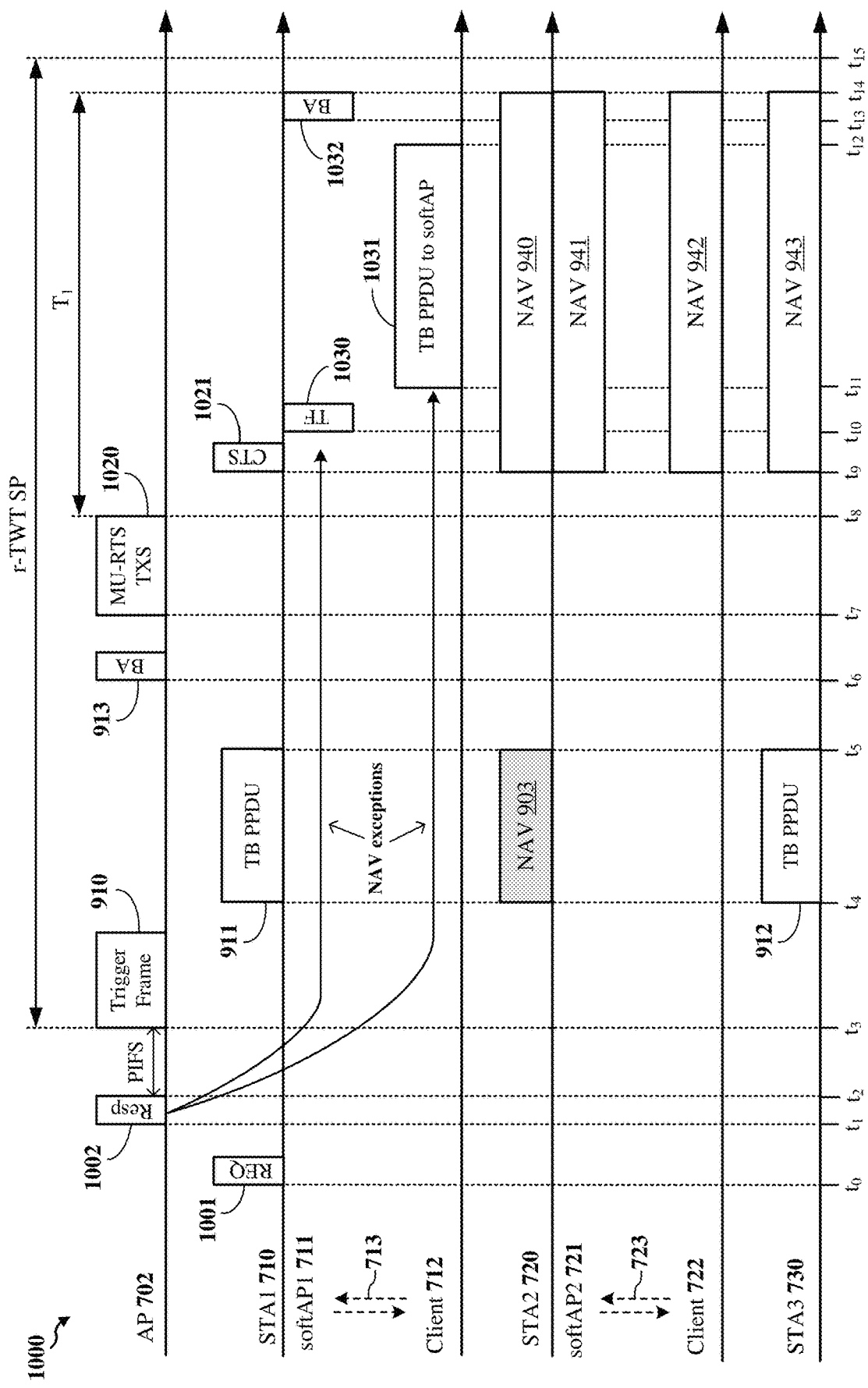
FIG. 10 shows a timing diagram depicting another example of wireless communication that supports latency sensitive traffic according to some implementations.

FIG. 10 shows a timing diagram depicting an example wireless communication 1000 among devices belonging to a BSS, according to some implementations. The BSS is shown to include the AP 702, the first STA 710, the second STA 720, and the third STA 730 described with reference to FIG. 7. In the example of FIG. 10, the first and second STAs 710 and 720 are members of a scheduled r-TWT SP, which spans a time period between times $t_3$ and $t_{15}$, whereas the third STA 730 is not a member of the r-TWT SP (and may thus be referred to as a "non-member STA"). As discussed, the first STA 710 is associated with the AP 702, and implements or operates a first collocated softAP 711 that has or can establish a P2P link 713 with the first client device 712. Similarly, the second STA 720 is associated with the AP 702, and implements or operates a second collocated softAP 721 that has or can establish a P2P link 723 with the second client device 722. Although only three low-latency STAs are shown in the example of FIG. 10, in actual implementations, the BSS may include any number of low-latency STAs, and may also include any number of non-legacy STAs.

The timing diagram of FIG. 10 is similar in many aspects to the timing diagram of FIG. 9, and differs from the timing diagram of FIG. 9 in some aspects. For example, while the NAV exception is signaled to the client device 712 and the first softAP 711 using the MU-R TS TXS trigger frame 920 in the example communication 900 of FIG. 9, in the example communication 1000 of FIG. 10, the response frame 1002 can be used to signal the NAV exception to the first softAP 711 and its associated client device 712. Specifically, at time to, the first STA 710 transmits a request (REQ) frame 1001 over the wireless medium to the AP 702. The request frame 1001, which may be an example of the request frame 901 of FIG. 9, may include a request for the AP 702 to schedule a r-TWT SP during which P2P communications can be exchanged over the wireless medium between the client device 712 and the first softAP 711 with minimal (if any) interference from other nearby wireless communication devices.

In some instances, the request frame 1001 identifies the first softAP 711 and its associated client device 712 as participants of P2P communications scheduled during at least a portion of the r-TWT SP. For example, the request frame 1001 may include the MAC addresses of the first softAP 711 and the client device 712. The AP 702 can use the MAC addresses, or other suitable identifiers, of the first softAP 711 and client device 712 to construct a NAV exception for the first softAP 711 and client device 712. In some instances, the AP 702 may construct a NAV exception for P2P communications associated with softAPs that are collocated with STAs that are associated with the AP 702 and that are members of the r-TWT SP.

The AP 702 receives the request frame 1001 between times $t_0$ and $t_1$, and obtains the identities of the first softAP 711 and client device 712 (or other devices intending to participate in the r-TWT SP). In some instances, the request frame 1001 may indicate an intent of the first STA 710 to use the wireless medium during allocated portions of a TXOP obtained by the AP 702 for P2P communications between the first softAP 711 and its client device 712. The request frame 1001 may also indicate one or more TWT parameters requested by the first STA 710 for the r-TWT SP.

The AP 702 constructs a NAV exception that may allow low-latency devices affiliated with one or more associated STAs but not part of the BSS or associated with the AP 702 to transmit or receive P2P communications during an allocated portion of the r-TWT SP. Specifically, in some instances, the NAV exception may identify one or more devices within wireless range of the AP 702, or within wireless range of one or more STAs associated with the AP 702, that are to ignore NAV durations indicated by certain trigger frames transmitted by the AP 702 and certain response frames transmitted by the associated STAs.

In the example of FIG. 10, the NAV exception constructed by the AP 702 may indicate that the first softAP 711 and its client device 712 are to ignore NAV durations indicated by MU-RTS TXS trigger frames subsequently transmitted during the r-TWT SP. The NAV exception may also indicate that the first softAP 711 and its client device 712 are to ignore NAV durations indicated by CTS frames that follow the MU-RTS TXS trigger frames. As a result, while other wireless communication devices that are not members of the r-TWT SP or not identified by a MU-RTS TXS trigger frame set their respective NAVs based on the duration indicated by the MU-RTS TXS trigger frame (or the CTS frame that follows), the first softAP 711 and its associated client device 712 do not set their respective NAVs based on durations indicated by the MU-RTS TXS trigger frame or the CTS frame that follows the MU-RTS TXS trigger frame.

Specifically, when the AP 702 transmits the MU-RTS TXS trigger frame 920 on the wireless medium between times $t_8$ and $t_9$, the first softAP 711 and the client device 712 ignore the NAV durations indicated by the MU-RTS TXS trigger frame 920 based on the NAV exception indicated by the AP 702 in the response frame 1002. The first softAP 711 and the client device 712 may also ignore the NAV durations indicated by the CTS frame 921 transmitted by the first STA 710 between times $t_9$ and $t_{10}$, based on the NAV exception. As such, the first softAP 711 and its associated client device 712 do not set their respective NAVs based on the duration indicated by the MU-RTS TXS trigger frame 920 or the following CTS frame 921, thereby allowing the first softAP 711 and its associated client device 712 to transmit or receive low-latency P2P communications over the P2P link 713 during portions of the r-TWT SP allocated to the first STA 710.

For example, when the first softAP 711 transmits the trigger frame 1030 over the wireless medium to its associated client device 712 at time $t_{10}$, the client device 712 does not have its NAV set, and therefore can receive and decode the trigger frame 1030. In response to the trigger frame 1030, the client device 712 may transmit a TB PPDU 1031 to the first softAP 711 between times $t_{11}$ and $t_{12}$. The first softAP 711 receives the TB PPDU 1031, and sends a block ACK 1032 to the client device 712 at time $t_{13}$. The second STA 720, the second softAP 721, the second client device 722, and the third STA 730 set their respective NAVs 940-943 to the duration indicated by the MU-RTS TXS trigger frame 1020, from times $t_9$ to $t_{14}$, and therefore do not attempt to access the wireless medium during the r-TWT SP between times $t_9$ and $t_{14}$, thereby reducing contention and interference on the wireless medium during the allocated portion of the r-TWT SP.

In some other implementations, the softAPs 711 and 721 and their associated client devices 712 and 722 may ignore NAV durations indicated by certain frames (such as the MU-RTS TXS trigger frame 920 and the CTS frame 921) based on a rule specified or otherwise defined by a wireless communication protocol (such as the IEEE 802.11 family of wireless communication standards). In these other implementations, the first softAP 711 and its associated client device 712 may obtain the NAV exception during association or authentication operations between the first STA 710 and the AP 702. Similarly, the second softAP 721 and its associated client device 722 may obtain the NAV exception during association or authentication operations between the second STA 720 and the AP 702.

Figure 11:
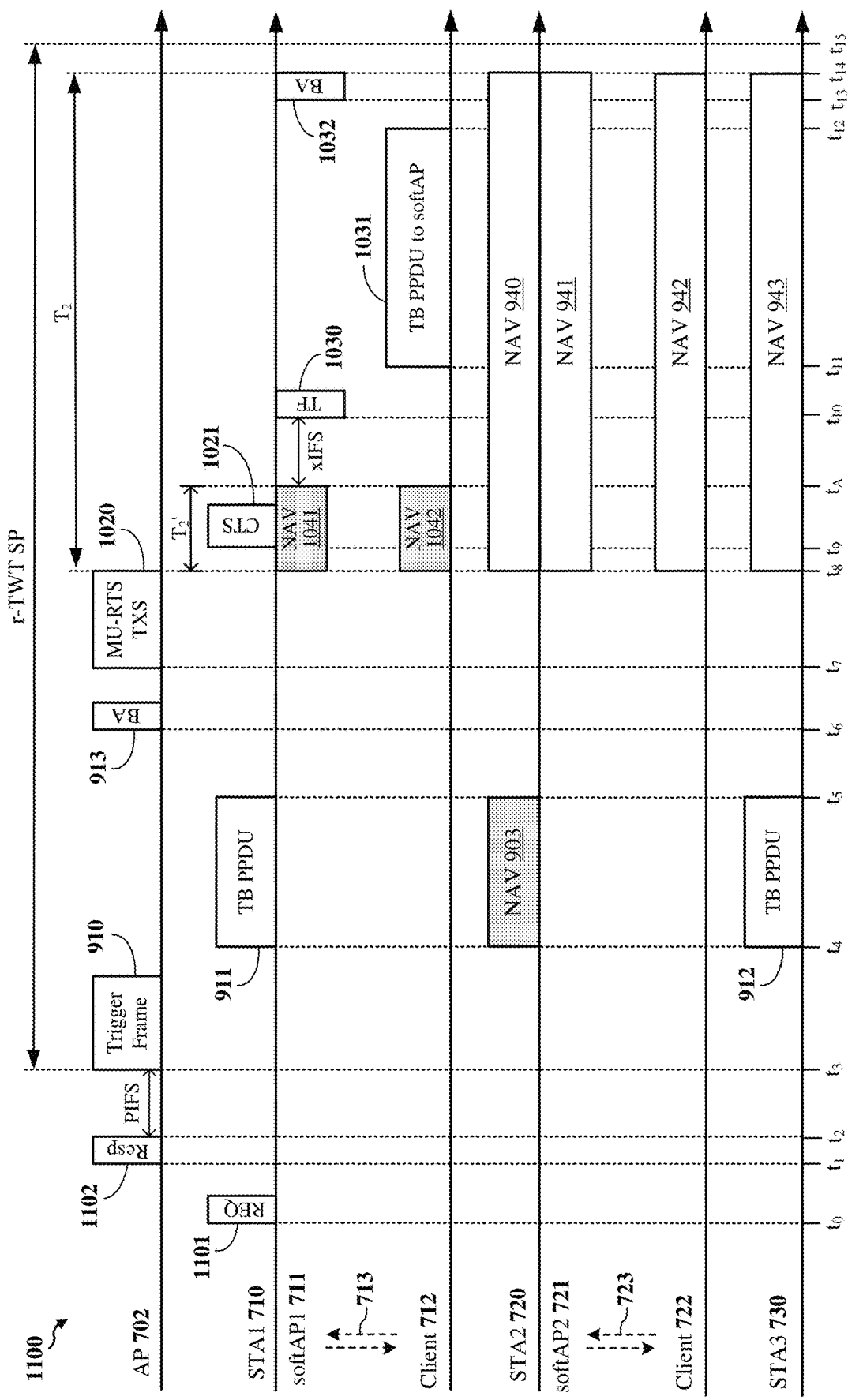
FIG. 11 shows a timing diagram depicting another example of wireless communication that supports latency sensitive traffic according to some implementations.

FIG. 11 shows a timing diagram depicting an example wireless communication 1100 among devices belonging to a BSS, according to other implementations. The BSS is shown to include the AP 702, the first STA 710, the second STA 720, and the third STA 730 described with reference to FIG. 7. As discussed, the first STA 710 is associated with the AP 702, and implements or operates a first collocated softAP 711 that is associated with the first client device 712. Similarly, the second STA 720 is associated with the AP 702, and implements or operates a second collocated softAP 721 that is associated with the second client device 722. Although only three low-latency STAs are shown in the example of FIG. 11, in actual implementations, the BSS may include any number of low-latency STAs, and may also include any number of non-legacy STAs.

The timing diagram of FIG. 11 is similar in many aspects to the timing diagram of FIGS. 9 and 10, and differs from the timing diagrams of FIGS. 9 and 10 in some aspects. For example, while the example communications 900 and 1000 described with reference to FIGS. 9 and 10 include mechanisms to indicate a NAV exception to the softAPs 711 and 721 and their associated client devices 712 and 722, the example communications 1100 of FIG. 11 may not indicate or signal NAV exceptions. Instead, the AP 702 may allocate a portion of a TXOP obtained during the r-TWT SP for latency sensitive P2P communications for a time period that is shorter than the time period indicated or requested by one or more of the associated STAs 710, 720, or 730 for such latency sensitive P2P communications.

In some implementations, the example of FIG. 11 uses modified request and response frames that can be used by STAs associated with the AP 702 to inform the AP 702 of latency sensitive P2P communications, as well as any corresponding low-latency P2P devices that intend to participate in the exchange of such P2P communications. For example, in some implementations, the first STA 710 transmits a request (REQ) frame 1101 over the wireless medium to the AP 702 at time to. The request frame 1101, which may be an example of the request frame 901 of FIG. 9 or the request frame 1001 of FIG. 10, may include a request for the AP 702 to schedule a r-TWT SP for P2P communications between the first softAP 711 and the client device 712. The request frame 1101 may identify the first softAP 711 and the client device 712 as participants of the P2P communications scheduled during the r-TWT SP. In some aspects, the request frame 1101 may include the MAC addresses of the first softAP 711 and the client device 712. The request frame 1101 may also indicate a period of time $T_2$ for allocating the wireless medium to the first STA 710 for P2P communications between the first softAP 711 and client device 712.

The AP 702 receives the request frame 1101 between times to and $t_1$, and obtains the TWT parameters, the identities of the first softAP 711 and client device 712, and the requested period of time $T_2$. As depicted in the example of FIG. 11, the AP 702 selects a modified period of time $T_2'$ that is shorter than the requested period of time $T_2$, and sets the duration field of the MU-RTS TXS trigger frame 1020 to the modified (shorter) period of time $T_2'$.

When the AP 702 transmits the MU-RTS TXS trigger frame 1020 over the wireless medium between times $t_7$ and $t_8$, the first softAP 711 and the client device 712 set their respective NAVs to the shorter period of time $T_2'$ indicated by the MU-RTS TXS trigger frame 1020. Specifically, the first softAP 711 and the client device 712 set their respective NAVs 1041 and 1042 to the shorter period of time $T_2'$, which spans from times $t_8$ to $t_4$. As discussed, the shorter period of time $T_2'$ is sufficient to protect the wireless medium while the first STA 710 receives the MU-RTS TXS trigger frame 1020 and transmits the CTS frame 1021.

At time $t_4$, the NAV 1041 of the first softAP 711 expires, and after waiting at least a SIFS duration from times $t_4$ to $t_{10}$, the first softAP 711 transmits the trigger frame 1030 over the wireless medium to the client device 712. In some instances, the first softAP 711 may wait for a PIFS duration before transmitting the trigger frame 1030 on the wireless medium. In the example of FIG. 11, the trigger frame 1030 identifies the client device 712, for example, by including the MAC address (or another suitable identifier) in a User Info field included in the trigger frame 1030.

The client device 712, whose NAV 1042 also expired at time $t_4$, receives the trigger frame 1030 between times $t_{11}$ and $t_{12}$. In some instances, the trigger frame 1030 may solicit UL P2P transmissions from the client device 712. In response to receiving the trigger frame 1030, the client device 712 transmits a TB PPDU 1031 on the wireless medium to the first softAP 711 between times $t_{11}$ and $t_{12}$. The first softAP 711 receives the TB PPDU 1031, and acknowledges reception of the TB PPDU 1031 by transmitting a block ACK frame 1032 to the client device 712 between times $t_{13}$ and $t_{14}$. The period of time $T_2$ indicated or requested by the first STA 710 ends at time $t_{14}$. In some instances, the NAVs 940-943 associated with the second STA 720, the second softAP 721, the second client device 722, and the third STA 730 are set to a duration of time spanning from times $t_8$ to $t_{14}$. The r-TWT SP ends at time $t_{15}$.

Figure 12:
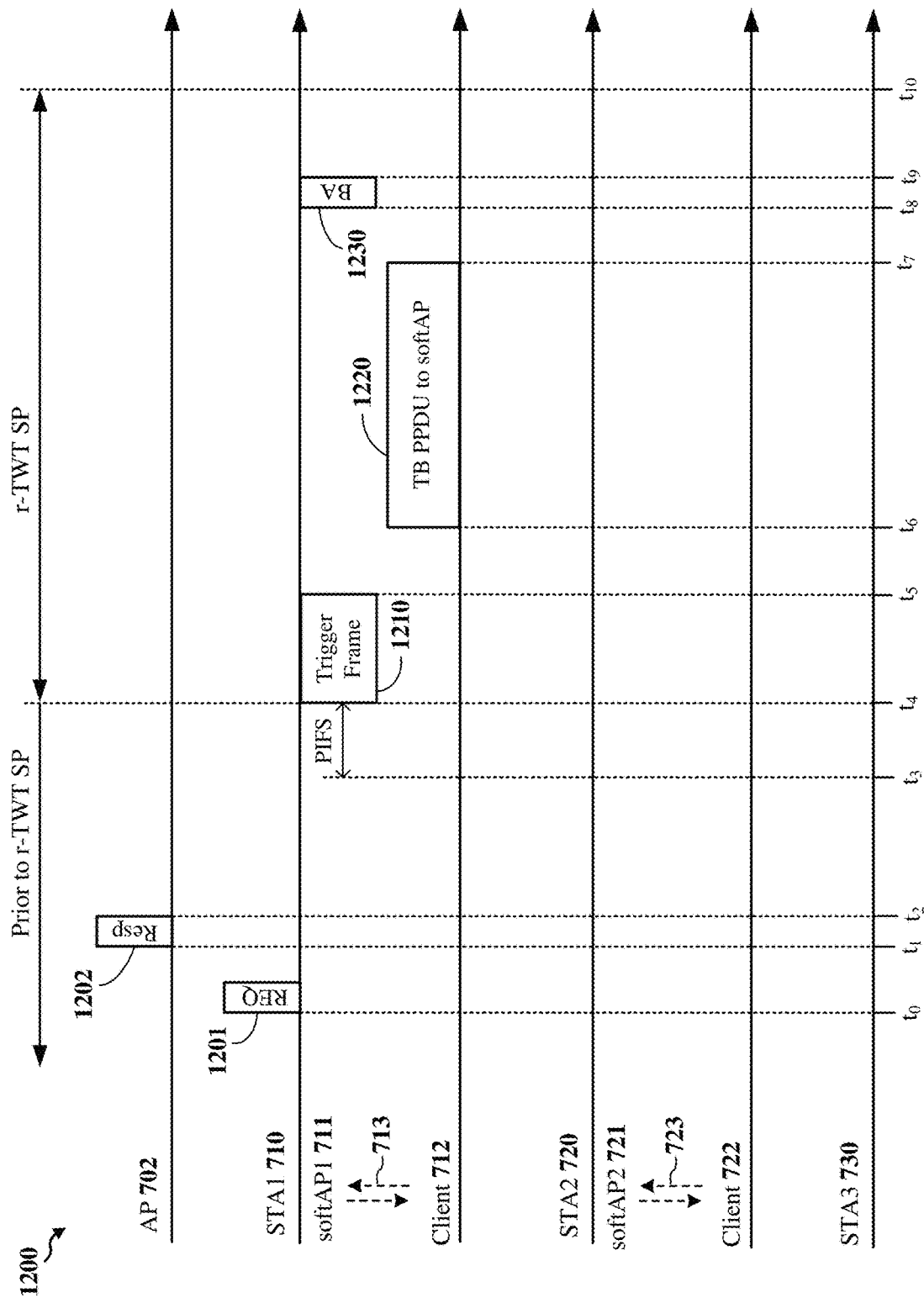
FIG. 12 shows a timing diagram depicting another example of wireless communication that supports latency sensitive traffic according to some implementations.

FIG. 12 shows a timing diagram depicting an example wireless communication 1200 among devices belonging to a BSS, according to other implementations. The BSS is shown to include the AP 702, the first STA 710, the second STA 720, and the third STA 730 described with reference to FIG.

7. As discussed, the first STA 710 is associated with the AP 702, and implements or operates a first collocated softAP 711 that is associated with the first client device 712. Similarly, the second STA 720 is associated with the AP 702, and implements or operates a second collocated softAP 721 that is associated with the second client device 722. Although only three low-latency STAs are shown in the example of FIG. 12, in actual implementations, the BSS may include any number of low-latency STAs, and may also include any number of non-legacy STAs.

The timing diagram of FIG. 12 is similar in many aspects to the timing diagram of FIG. 8, except that the example communications 1200 of FIG. 12 do not use MU-RTS TXS trigger frames. Instead, the example communications 1200 use signaling that allows the first STA 710 to inform the AP 702 of its intention to utilize the wireless medium for P2P communications between the first softAP 711 and client device 712.

Specifically, at time $t_0$, the first STA 710 transmits a request (REQ) frame 1201 over the wireless medium to the AP 702. The request frame 1201 may include a request for the AP 702 to schedule a r-TWT SP during which the first softAP 711 can use the wireless medium to transmit or receive low-latency data to or from client device 712. In some implementations, the request frame 1201 includes a vendor-specific information element (VSIE) that indicates the intention of the first STA 710. In some instances, the VSIE may also indicate various TWT parameters for the requested r-TWT SP. For example, the VSIE may indicate a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

Between times $t_0$ and $t_1$, the AP 702 decodes the request frame 1201, and obtains the TWT parameters and the intention of the first STA 710 to use the wireless medium allocated to the first STA 710 during a portion of the r-TWT SP for P2P communications between the first softAP 711 and the client device 712.

At time $t_1$, the AP 702 transmits a response (Resp) frame 1202 on the wireless medium to the first STA 710. The response frame 1202 may include a VSIE indicating a set of TWT parameters to be used for the scheduled r-TWT SP. In some implementations, the VSIE may also indicate the number of devices that are members of the r-TWT SP. This information may allow the first STA 710 to determine whether it is the only member of the r-TWT SP, and thus whether it can use aggressive channel access techniques, rather than MU-RTS TXS trigger frames, during the r-TWT SP. In some aspects, the VSIE may also identify the first softAP 711 and the client device 712.

The first softAP 711 senses that the wireless medium is idle for at least a SIFS duration, from times $t_3$ to $t_4$, based on a channel sensing operation (such as clear channel assessment (CCA)) before attempting to acquire a TXOP. At time $t_4$, the first softAP 711 senses that the wireless medium is still idle and transmits a trigger frame 1200 on the wireless medium. In the example of FIG. 12, the trigger frame 1200 identifies the client device 712, for example, by including a device identifier (such as a MAC address) of the client device 712 in the User Info field of the trigger frame 1200.

The client device 712 receives the trigger frame 1200, and determines that the trigger frame 1200 identifies the client device 712. In response to receiving the trigger frame 1200, the client device 712 transmits a TB PPDU 1220 on the wireless medium to the first softAP 711 between times $t_6$ and $t_7$. The first softAP 711 receives the TB PPDU 1220, and acknowledges reception of the TB PPDU 1220 by transmitting a block ACK frame 1230 to the client device 712 between times $t_8$ and $t_9$. The r-TWT SP ends at time $t_{10}$.

Figure 13:
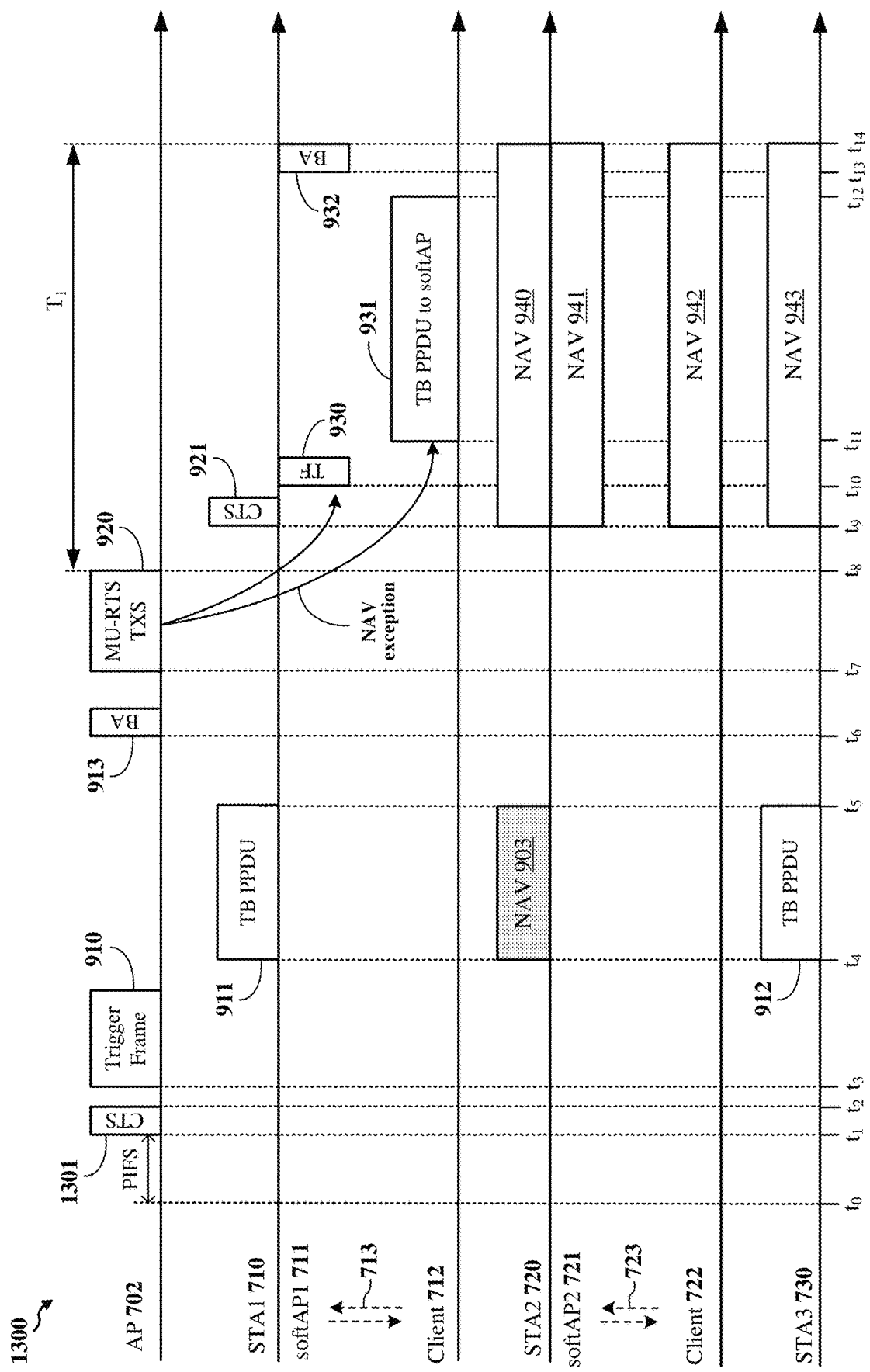
FIG. 13 shows a timing diagram depicting another example of wireless communication that supports latency sensitive traffic according to some implementations.

FIG. 13 shows a timing diagram depicting an example wireless communication 1300 among devices belonging to a BSS, according to other implementations. The BSS is shown to include the AP 702, the first STA 710, the second STA 720, and the third STA 730 described with reference to FIG. 7. As discussed, the first STA 710 is associated with the AP 702, and implements or operates a first (collocated) softAP 711 that is associated with the first client device 712. Similarly, the second STA 720 is associated with the AP 702, and implements or operates a second (collocated) softAP 721 that is associated with the second client device 722. Although only three low-latency STAs are shown in the example of FIG. 13, in actual implementations, the BSS may include any number of low-latency STAs, and may also include any number of non-legacy STAs.

The timing diagram of FIG. 13 is similar in many aspects to the timing diagram of FIG. 9, except that the example communications 1300 of FIG. 13 occur outside any r-TWT SP. In some implementations, the AP 702 senses that the medium is idle for a PIFS duration, from times $t_0$ to $t_1$, based on a channel sensing operation (such as clear channel assessment (CCA)) before attempting to acquire a TXOP. At time $t_1$, the AP 702 senses that the wireless medium is still idle and proceeds to acquire a TXOP, for example, by initiating a transmission over the shared medium. Specifically, the AP 702 transmits a CTS-to-self (CTS2self) frame 1301 on the wireless medium to reserve the wireless medium long enough to obtain a TXOP. The AP 702 obtains a TXOP on the wireless medium, and at time $t_3$ transmits a trigger frame 910 that identifies the first STA 710 and the second STA 720 for a triggered-based UL transmission. In some instances, the trigger frame 910 includes Per User Info fields that carry the association identifiers (AIDs) assigned to the first and second STAs 710 and 720.

The frame sequences between times $t_3$ and $t_{14}$ in the example communication 1300 of FIG. 13 and similar to the frame sequences between times $t_3$ and $t_{14}$ in the example communication 900 of FIG. 9. For example, the AP 702 transmits a MU-RTS TXS trigger frame 920 over the wireless medium between times $t_7$ and $t_8$. The MU-RTS TXS trigger frame 920 allocates a portion of the TXOP obtained by the AP 702 for P2P communications between the client device 712 and the first softAP1 711 during the r-TWT SP. The MU-RTS TXS trigger frame 920 includes a duration field indicating a duration of time ($T_1$) for which the TXOP is allocated for P2P communications. In this way, receiving devices not identified by the MU-RTS TXS trigger frame 920 set their respective NAVs to the indicated duration of time $T_1$, for example, so that low-latency P2P communications between the client device 712 and the first softAP 711 are not interrupted or degraded.

The MU-RTS TXS trigger frame 920 signals a NAV exception indicating that the first softAP 711 and client device 712 are to ignore NAV durations indicated by the MU-RTS TXS trigger frame 920 or NAV durations indicated by CTS frames that follow the MU-RTS TXS trigger frame 920. In some aspects, the MU-RTS TXS trigger frame 920 may include or indicate the MAC addresses of the first softAP 711 and client device 712, for example, so that the first softAP 711 and client device 712 receive and decode the MU-RTS TXS trigger frame 920. In this way, the first softAP 711 can transmit the trigger frame 930 to the client device 712 at time $t_{10}$, and the client device 712 can transmit the TB PPDU 931 to the first softAP 711 between times $t_{11}$ and $t_{12}$.

Figure 14:
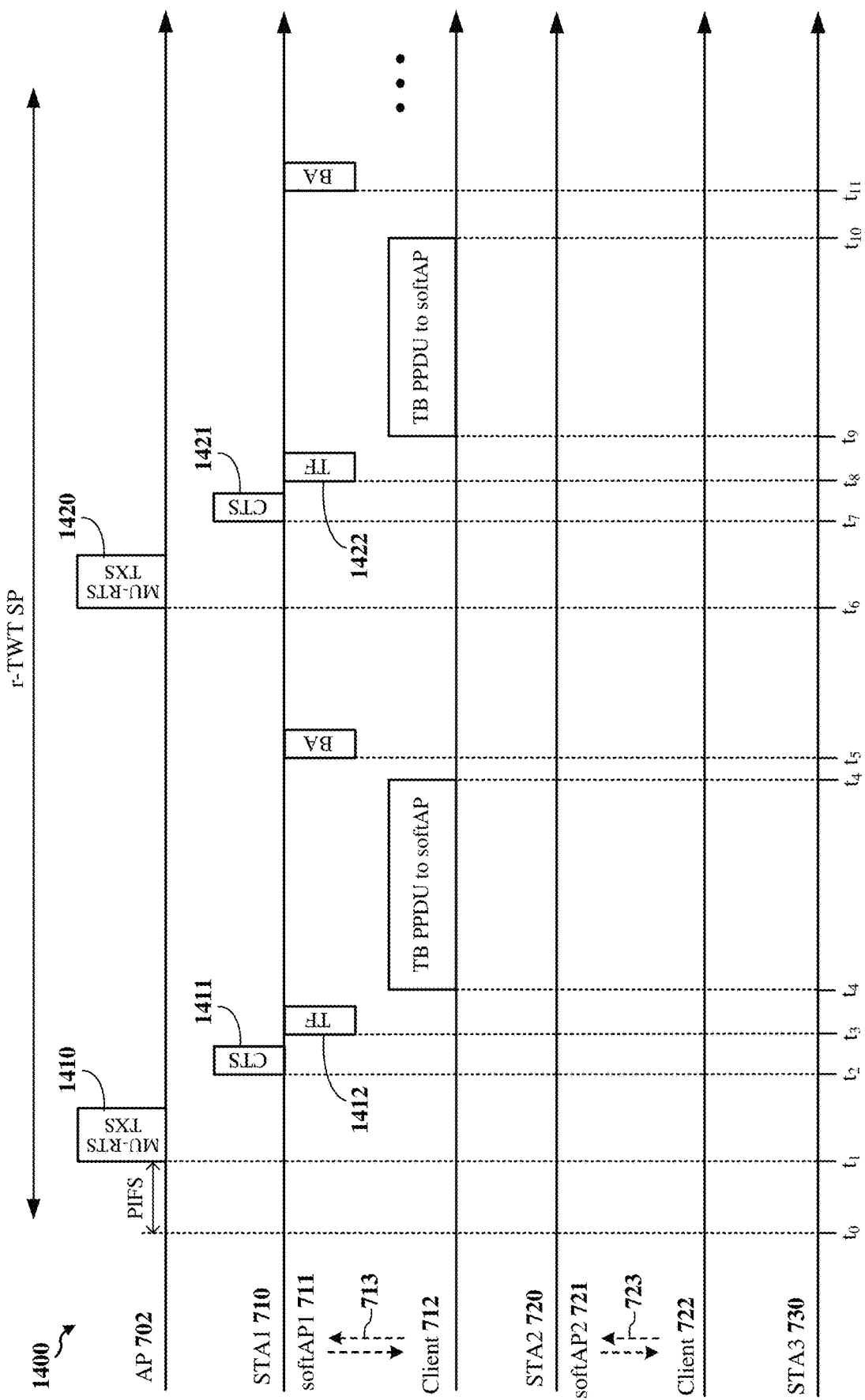
FIG. 14 shows a timing diagram depicting another example of wireless communication that supports latency sensitive traffic according to some implementations.

FIG. 14 shows a timing diagram depicting an example wireless communication 1400 among devices belonging to a BSS, according to other implementations. The BSS is shown to include the AP 702, the first STA 710, the second STA 720, and the third STA 730 described with reference to FIG. 7. As discussed, the first STA 710 is associated with the AP 702, and implements or operates a first collocated softAP 711 that is associated with the first client device 712. Similarly, the second STA 720 is associated with the AP 702, and implements or operates a second collocated softAP 721 that is associated with the second client device 722. Although only three low-latency STAs are shown in the example of FIG. 14, in actual implementations, the BSS may include any number of low-latency STAs, and may also include any number of non-legacy STAs. In the example of FIG. 14, the AP 702 schedules multiple P2P sessions within a r-TWT SP in a time duplexed manner.

For example, the AP transmits an MU-RTS TXS trigger frame 1410 at time $t_1$ to allocate a portion of a TXOP obtained by the AP 702 for P2P communications associated with the first STA 710. At time $t_2$, the first softAP 711 transmits a CTS frame 1511 to the AP 702. At time $t_3$, the first softAP 711 senses that the wireless medium is idle, and transmits a trigger frame 1412 on the wireless medium to the client device 712. In the example of FIG. 14, the trigger frame 1412 identifies the client device 712, for example, by including the MAC address (or another suitable identifier) in a User Info field included in the trigger frame 1412. The client device 712 receives the trigger frame 1412, and transmits a TB PPDU 931 on the wireless medium to the first softAP 711 between times $t_4$ and $t_5$. The first softAP 711 receives the TB PPDU, and acknowledges reception of the TB PPDU by transmitting a block ACK frame to the client device 712 at time $t_5$.

Then, at time $t_6$, the AP transmits another MU-RTS TXS trigger frame 1420 to allocate a portion of a TXOP obtained by the AP 702 for P2P communications associated with the second STA 720. At time $t_8$, the second softAP 721 senses that the wireless medium is idle, and transmits a trigger frame 1422 on the wireless medium to the client device 722. In the example of FIG. 14, the trigger frame 1422 identifies the client device 722, for example, by including the MAC address (or another suitable identifier) in a User Info field included in the trigger frame 1422. The client device 722 receives the trigger frame 1422, and transmits a TB PPDU 931 on the wireless medium to the second softAP 721 between times $t_9$ and $t_{10}$. The second softAP 721 receives the TB PPDU, and acknowledges reception of the TB PPDU by transmitting a block ACK frame to the client device 722 at time $t_{11}$.

Figure 15:
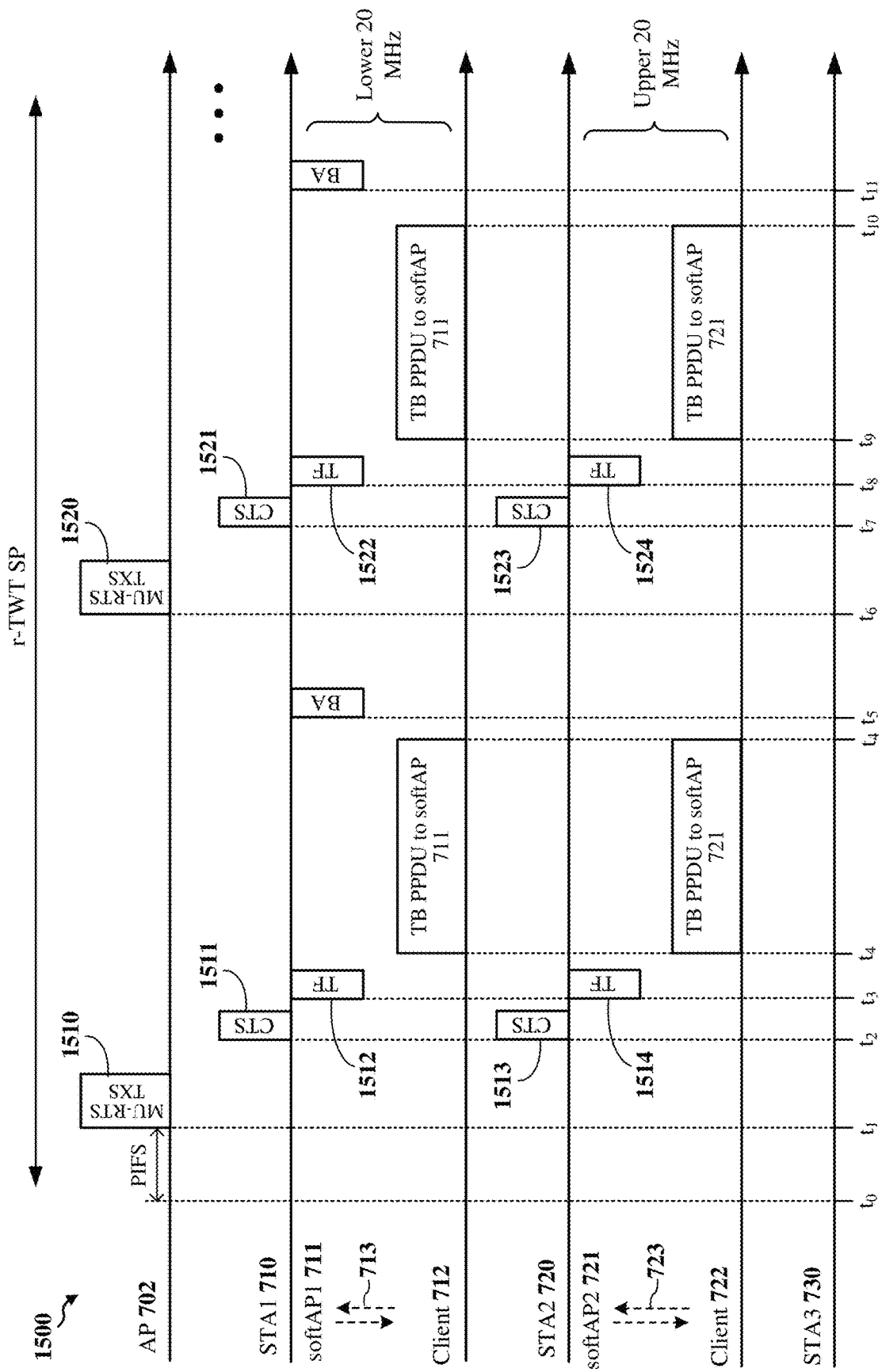
FIG. 15 shows a timing diagram depicting another example of wireless communication that supports latency sensitive traffic according to some implementations.

FIG. 15 shows a timing diagram depicting an example wireless communication 1500 among devices belonging to a BSS, according to other implementations. The BSS is shown to include the AP 702, the first STA 710, the second STA 720, and the third STA 730 described with reference to FIG. 7. As discussed, the first STA 710 is associated with the AP 702, and implements or operates a first collocated softAP 711 that is associated with the first client device 712. Similarly, the second STA 720 is associated with the AP 702, and implements or operates a second collocated softAP 721 that is associated with the second client device 722. Although only three low-latency STAs are shown in the example of FIG. 15, in actual implementations, the BSS may include any number of low-latency STAs, and may also include any number of non-legacy STAs. The timing diagram of FIG. 15 is similar to the timing diagram of FIG. 14, except that the AP 702 uses frequency multiplexing to scheduled multiple P2P sessions within a r-TWT SP, concurrently. As shown, the AP 702 schedules P2P communications associated with the first STA 710 in a lower 20 MHz frequency subband, and schedules P2P communications associated with the second STA 720 in a upper 20 MHz frequency subband.

For example, the AP transmits an MU-RTS TXS trigger frame 1510 at time $t_1$ to allocate a portion of a TXOP obtained by the AP 702 for P2P communications associated with the first STA 710 on a lower 20 MHz frequency subband and to allocate the portion of the TXOP for P2P communications associated with the second STA 720 on an upper 20 MHz frequency subband. At time $t_2$, the first softAP 711 transmits a CTS frame 1511 to the AP 702. At time $t_3$, the first softAP transmits a trigger frame 1512 on the wireless medium to the client device 712. In the example of FIG. 15, the trigger frame 1512 identifies the client device 712, for example, by including the MAC address (or another suitable identifier) in a User Info field included in the trigger frame 1512. The client device 712 receives the trigger frame 1512, and transmits a TB PPDU on the wireless medium to the first softAP 711 between times $t_4$ and $t_5$. The first softAP 711 receives the TB PPDU, and acknowledges reception of the TB PPDU by transmitting a block ACK frame to the client device 712 at time $t_5$. Then, at time $t_6$, the AP transmits another MU-RTS TXS trigger frame 1520. At time $t_8$, the first softAP 711 transmits a trigger frame 1522 on the wireless medium to the client device 712.

Figure 16:
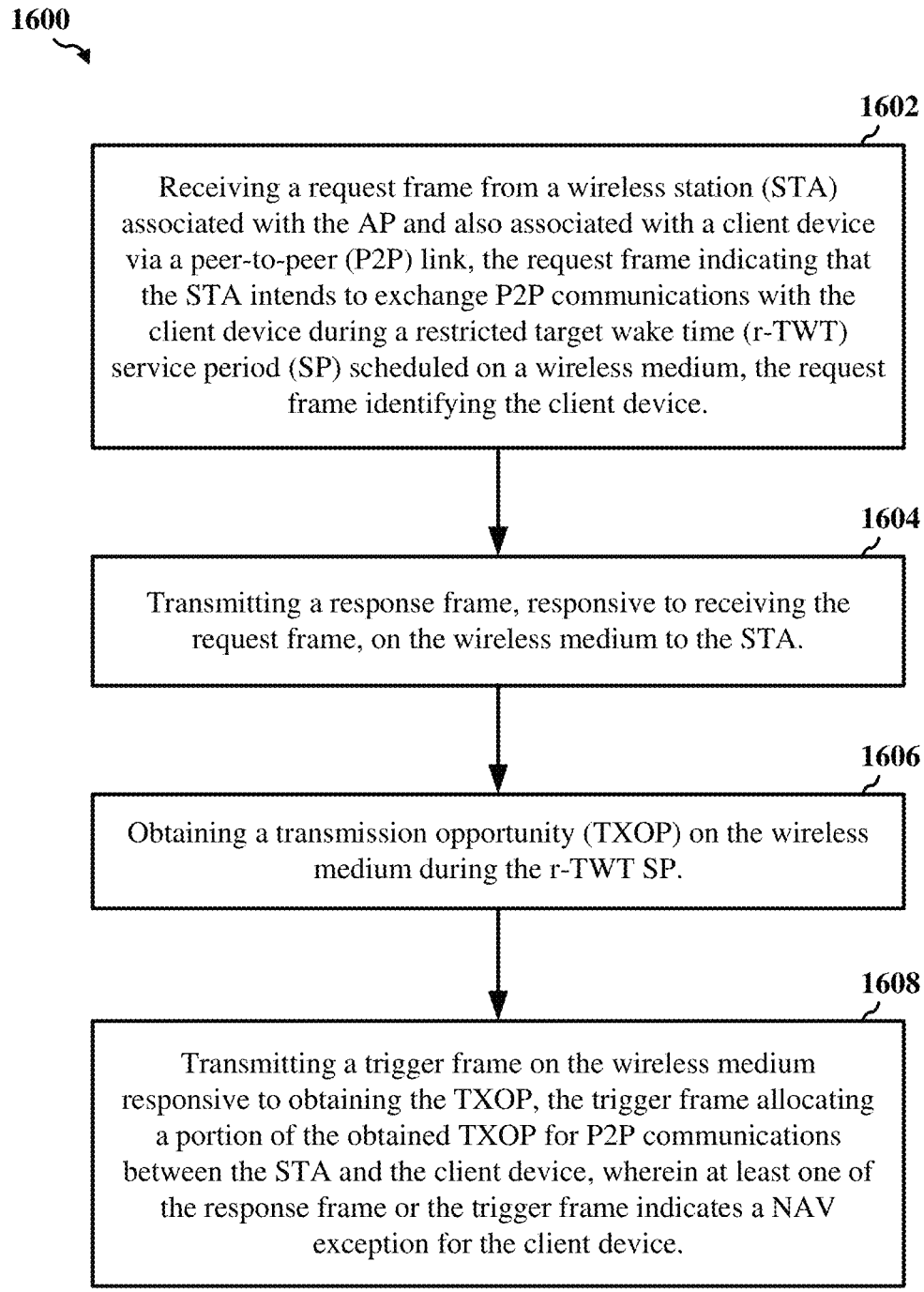
FIG. 16 shows a flowchart illustrating an example process for wireless communication that supports low-latency communications according to some implementations.

FIG. 16 shows a flowchart illustrating an example process 1600 for wireless communication that supports low-latency communications according to some implementations. The process 1600 may be performed by a wireless communication device such as the wireless communication device 500 described above with reference to FIG. 5. In some implementations, the process 1600 may be performed by a wireless communication device operating as or within an AP, such as one of the APs 102 and 602 described above with reference to FIGS. 1 and 6A, respectively.

In some implementations, the process 1600 begins in block 1602 with receiving a request frame from a wireless station (STA) associated with the AP and also associated with a client device via a peer-to-peer (P2P) link, the request frame indicating that the STA intends to exchange P2P communications with the client device during a restricted target wake time (r-TWT) service period (SP) scheduled on a wireless medium, the request frame identifying the client device. In block 1604, the process 1600 continues with transmitting a response frame, responsive to receiving the request frame, on the wireless medium to the STA. In block 1606, the process 1600 continues with obtaining a transmission opportunity (TXOP) on the wireless medium during the r-TWT SP. In block 1608, the process 1600 continues with transmitting a trigger frame on the wireless medium responsive to obtaining the TXOP, the trigger frame allocating a portion of the obtained TXOP for P2P communications between the STA and the client device, where at least one of the response frame or the trigger frame indicates a NAV exception for the client device. In some instances, each of the response frame and the trigger frame may include a medium access control (MAC) address of the client device.

In some implementations, the NAV exception indicates that the client device is to ignore a NAV duration indicated by the trigger frame and a NAV duration indicated by a clear-to-send (CTS) frame that follows the trigger frame. In some aspects, the trigger frame includes a Carrier Sense (CS) Required field carrying a bit set to a value of 0, wherein the bit set to the value of 0 indicates the NAV exception.

The request frame may be any suitable frame that can request a r-TWT SP and signal an intention of the STA to use the wireless medium for P2P communications with the client device during the r-TWT SP. In some implementations, the request frame may be a TWT request frame that includes a TWT Element indicating the MAC address of the client device. In some aspects, the TWT Element may be used to signal the STA's intention to use the wireless medium for P2P communications with the client device during the r-TWT SP. The TWT Element may also indicate various TWT parameters including (but not limited to) a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

In other implementations, the request frame may be a Stream Classification Service (SCS) request frame that includes a traffic specification (TSPEC) Element indicating the MAC address of the client device. The TSPEC Element may also indicate a traffic stream (TS) associated with the P2P communications, a minimum data rate for the restricted TWT session, a mean data rate for the restricted TWT session, a delay bound for the r-TWT SP, and a user priority (UP) for the r-TWT SP. In some other implementations, the request frame may be a P2P request frame that indicates the MAC address of the client device and signals the intention of the STA to use the wireless medium for P2P communications with the client device during the r-TWT SP. In some instances, the P2P request frame may include one or more of a TWT Element, a TSPEC Element, or a vendor-specific information element (VSIE) that indicates the MAC address of the client device and signals the STA's intention. The TWT Element, if present in the P2P request frame, may also indicate TWT parameters associated with the r-TWT SP. The TSPEC Element, if present in the P2P request frame, may also indicate various QoS parameters, data rates, access categories, and user priorities of P2P links associated with the BSS.

The response frame may be any suitable frame that can confirm scheduling of the r-TWT SP requested by the STA. In some implementations, the response frame may be a TWT response frame indicating the MAC address of the client device. The TWT response frame may include a TWT Element indicating a set of TWT parameters to be used by devices that are members of the r-TWT SP. In other implementations, the response frame may be an SCS response frame indicating the MAC address of the client device. The SCS response frame may include a TSPEC Element may include a TSPEC indicating the MAC address of the client device. The TSPEC Element may also indicate various QoS parameters, data rates, access categories, and user priorities of P2P links associated with the BSS. In some other implementations, the response frame may be a P2P response frame that indicates the MAC address of the client device and signals the intention of the STA to use the wireless medium for P2P communications with the client device during the r-TWT SP. In some instances, the P2P response frame may include one or more of a TWT Element, a TSPEC Element, or a VSIE that indicates the MAC address of the client device and signals the STA's intention. The TWT Element, if present in the P2P response frame, may also indicate the set of TWT parameters to be used by member devices during the r-TWT SP. The TSPEC Element, if present in the P2P response frame, may also indicate various QoS parameters, data rates, access categories, and user priorities.

In some instances, the response frame may indicate the NAV exception for the client device. That is, the response frame may indicate that the client device is to ignore NAV durations set by trigger frames transmitted from the AP and NAV durations set by CTS frames responsive to the trigger frames. In other instances, the response frame may indicate the number of devices that are members of the r-TWT SP. The number of other devices belonging to the r-TWT SP may be used by the STA to select one or more attributes of the r-TWT SP. For example, if the STA is the only member of the r-TWT SP, the STA may determine that MU-RTS TXS trigger frames are not necessary (or not preferred), and may request a r-TWT SP that does not include transmissions of MU-RTS TXS trigger frames.

In some implementations, the trigger frame may be a multi-user (MU) Request-to-Send (RTS) TXOP Sharing (TXS) trigger frame. The MU-RTS TXS trigger frame may include a TXOP sharing mode subfield indicating a TXOP sharing mode associated with the P2P communications between the STA and the client device. In some instances, the TXOP sharing mode subfield indicates a request for the STA to transmit a CTS frame responsive to the MU-RTS TXS trigger frame. The CTS frame may include a receiver address field that contains the MAC address of the client device.

In some other implementations, the STA may include a collocated softAP that manages P2P communications between the STA and the client device. In some instances, the softAP may have a different MAC address than the STA. For example, the STA may include separate MAC entities that can independently communicate with the AP and the client device. In some aspects, a first MAC-AP endpoint may be associated with non-AP STA communications with the AP, and a second MAC-SAP endpoint may be associated with softAP communications with the client device. In these implementations, the NAV exception may also indicate that softAPs collocated with STAs belonging to the r-TWT SP are to ignore NAV durations indicated by trigger frames and NAV durations indicated by CTS frames that follow the trigger frames.

Figure 17:
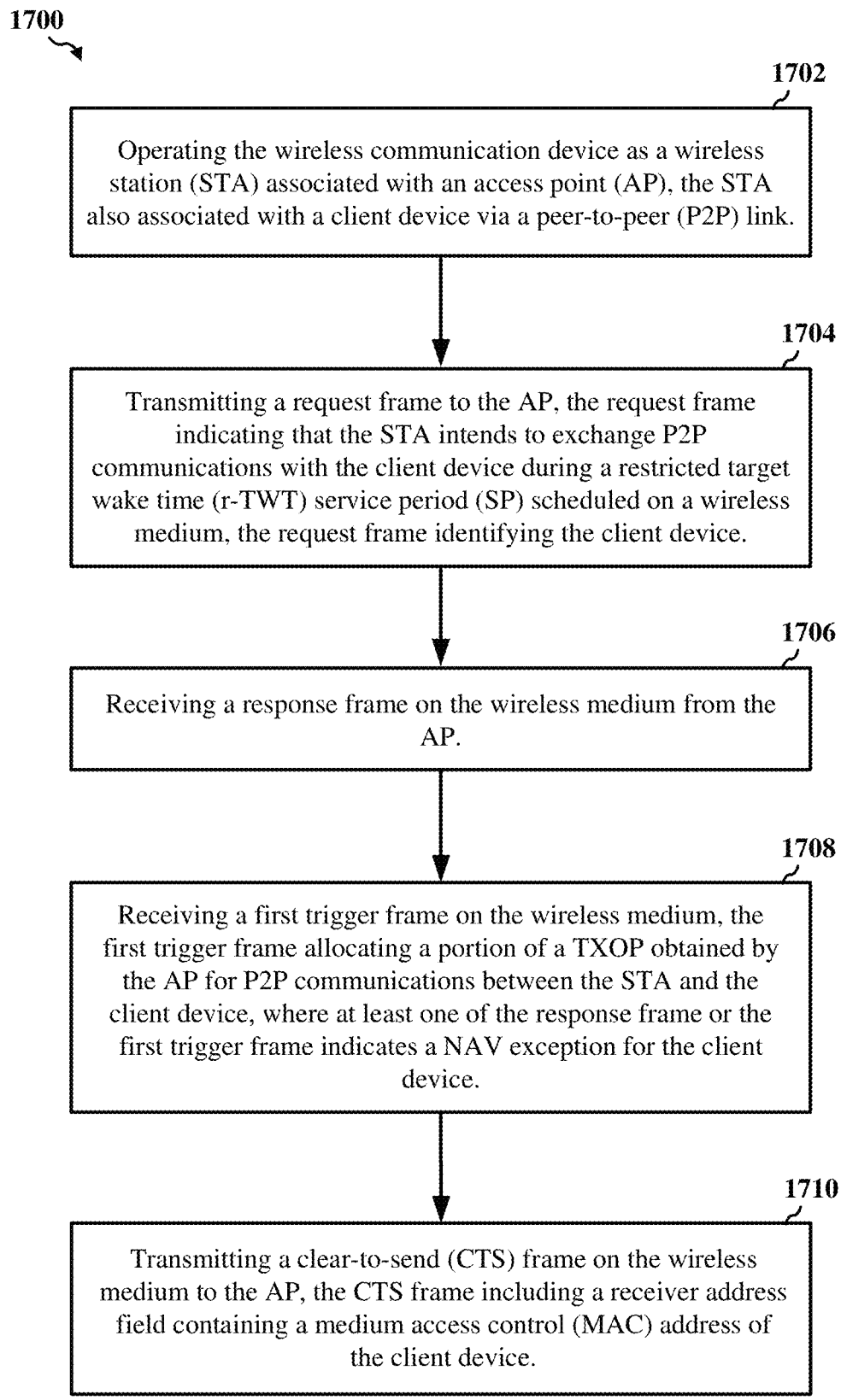
FIG. 17 shows a flowchart illustrating an example process for wireless communication that supports low-latency communications according to some other implementations.

FIG. 17 shows a flowchart illustrating an example process 1700 for wireless communications that supports low-latency communications according to some other implementations. The process 1700 may be performed by a wireless communication device such as the wireless communication device 500 described above with reference to FIG. 5. In some implementations, the process 1700 may be performed by a wireless communication device operating as or within a STA, such as one of the STAs 104 and 604 described above with reference to FIGS. 1 and 6B, respectively.

In some implementations, the process 1700 begins in block 1702 with operating the wireless communication device as a wireless station (STA) associated with an access point (AP), the STA also associated with a client device via a peer-to-peer (P2P) link. At block 1704, the process 1700 continues with transmitting a request frame to the AP, the request frame indicating that the STA intends to exchange P2P communications with the client device during a restricted target wake time (r-TWT) service period (SP) scheduled on a wireless medium, the request frame identifying the client device. At block 1706, the process 1700 continues with receiving a response frame on the wireless medium from the AP. At block 1708, the process 1700 continues with receiving a first trigger frame on the wireless medium, the first trigger frame allocating a portion of a transmission opportunity (TXOP) obtained by the AP for P2P communications between the STA and the client device, where at least one of the response frame or the first trigger frame indicates a NAV exception for the client device. At block 1710, the process 1700 continues with transmitting a clear-to-send (CTS) frame on the wireless medium to the AP, the CTS frame including a receiver address field containing a MAC address of the client device. In some aspects, each of the response frame and the first trigger frame includes the MAC address of the client device.

In some implementations, the NAV exception indicates that the client device is to ignore a NAV duration indicated by the trigger frame and a NAV duration indicated by a clear-to-send (CTS) frame that follows the trigger frame. In some aspects, the trigger frame includes a Carrier Sense (CS) Required field carrying a bit set to a value of 0, wherein the bit set to the value of 0 indicates the NAV exception.

The request frame may be any suitable frame that can request a r-TWT SP and signal an intention of the STA to use the wireless medium for P2P communications with the client device during the r-TWT SP. In some implementations, the request frame may be a TWT request frame that includes a TWT Element indicating the MAC address of the client device. In some aspects, the TWT Element may be used to signal the STA's intention to use the wireless medium for P2P communications with the client device during the r-TWT SP. The TWT Element may also indicate various TWT parameters including (but not limited to) a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

In other implementations, the request frame may be a Stream Classification Service (SCS) request frame that includes a traffic specification (TSPEC) Element indicating the MAC address of the client device. The TSPEC Element may also indicate a traffic stream (TS) associated with the P2P communications, a minimum data rate for the restricted TWT session, a mean data rate for the restricted TWT session, a delay bound for the r-TWT SP, and a user priority (UP) for the r-TWT SP. In some other implementations, the request frame may be a P2P request frame that indicates the MAC address of the client device and signals the intention of the STA to use the wireless medium for P2P communications with the client device during the r-TWT SP. In some instances, the P2P request frame may include one or more of a TWT Element, a TSPEC Element, or a vendor-specific information element (VSIE) that indicates the MAC address of the client device and signals the STA's intention. The TWT Element, if present in the P2P request frame, may also indicate TWT parameters associated with the r-TWT SP. The TSPEC Element, if present in the P2P request frame, may also indicate various QoS parameters, data rates, access categories, and user priorities of P2P links associated with the BSS.

The response frame may be any suitable frame that can confirm scheduling of the r-TWT SP requested by the STA. In some implementations, the response frame may be a TWT response frame indicating the MAC address of the client device. The TWT response frame may include a TWT Element indicating a set of TWT parameters to be used by devices that are members of the r-TWT SP. In other implementations, the response frame may be an SCS response frame indicating the MAC address of the client device. The SCS response frame may include a TSPEC Element may include a TSPEC indicating the MAC address of the client device. The TSPEC Element may also indicate various QoS parameters, data rates, access categories, and user priorities of P2P links associated with the BSS. In some other implementations, the response frame may be a P2P response frame that indicates the MAC address of the client device and signals the intention of the STA to use the wireless medium for P2P communications with the client device during the r-TWT SP. In some instances, the P2P response frame may include one or more of a TWT Element, a TSPEC Element, or a VSIE that indicates the MAC address of the client device and signals the STA's intention. The TWT Element, if present in the P2P response frame, may also indicate the set of TWT parameters to be used by member devices during the r-TWT SP. The TSPEC Element, if present in the P2P response frame, may also indicate various QoS parameters, data rates, access categories, and user priorities.

In some instances, the response frame may indicate the NAV exception for the client device. That is, the response frame may indicate that the client device is to ignore NAV durations set by trigger frames transmitted from the AP and NAV durations set by CTS frames responsive to the trigger frames. In other instances, the response frame may indicate the number of devices that are members of the r-TWT SP. The number of other devices belonging to the r-TWT SP may be used by the STA to select one or more attributes of the r-TWT SP. For example, if the STA is the only member of the r-TWT SP, the STA may determine that MU-RTS TXS trigger frames are not necessary (or not preferred), and may request a r-TWT SP that does not include transmissions of MU-RTS TXS trigger frames.

In some implementations, the trigger frame may be a multi-user (MU) Request-to-Send (RTS) TXOP Sharing (TXS) trigger frame. The MU-RTS TXS trigger frame may include a TXOP sharing mode subfield indicating a TXOP sharing mode associated with the P2P communications between the STA and the client device. In some instances, the TXOP sharing mode subfield indicates a request for the STA to transmit a CTS frame responsive to the MU-RTS TXS trigger frame. The CTS frame may include a receiver address field that contains the MAC address of the client device.

In some other implementations, the STA may include a collocated softAP that manages P2P communications between the STA and the client device. In some instances, the softAP may have a different MAC address than the STA. For example, the STA may include separate MAC entities that can independently communicate with the AP and the client device. In some aspects, a first MAC-AP endpoint may be associated with non-AP STA communications with the AP, and a second MAC-SAP endpoint may be associated with softAP communications with the client device. In these implementations, the NAV exception may also indicate that softAPs collocated with STAs belonging to the r-TWT SP are to ignore NAV durations indicated by trigger frames and NAV durations indicated by CTS frames that follow the trigger frames.

Figure 18:
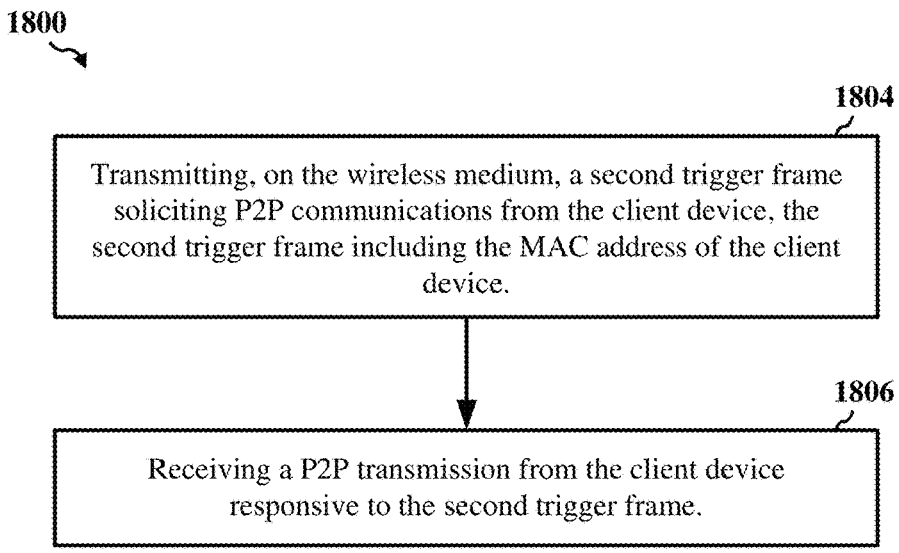
FIG. 18 shows a flowchart illustrating another example process for wireless communication that supports low-latency communications according to some other implementations.

FIG. 18 shows a flowchart illustrating an example process 1800 for wireless communications that supports low-latency communications according to some other implementations. The process 1800 may be performed by a wireless communication device such as the wireless communication device 500 described above with reference to FIG. 5. In some implementations, the process 1800 may be performed by a wireless communication device operating as or within a STA, such as one of the STAs 104 and 604 described above with reference to FIGS. 1 and 6B, respectively.

In some implementations, the process 1800 may be performed after transmitting the CTS frame in block 1710 of FIG. 17. For example, at block 1802, the process 1800 begins with transmitting, on the wireless medium, a second trigger frame soliciting P2P communications from the client device, the second trigger frame including the MAC address of the client device. At block 1804, the process 1800 continues with receiving a P2P transmission from the client device responsive to the second trigger frame. In some instances, the STA determines that the wireless medium is idle for at least a short interframe space (SIFS) duration prior to transmitting the second trigger frame to the client device. The P2P communications are received over a tunneled direct-link setup (TDLS) link established between the STA and the client device. In some aspects, the second time period may be based on a period of time associated with soliciting the CTS frame from the STA.

In some other implementations, the request frame indicates a first time period during which the STA intends to use the wireless medium within the r-TWT SP, and the first trigger frame includes a duration field indicating a second time period during which the portion of the TXOP is allocated to the STA, the second time period being shorter than the first time period.

Figure 19A:
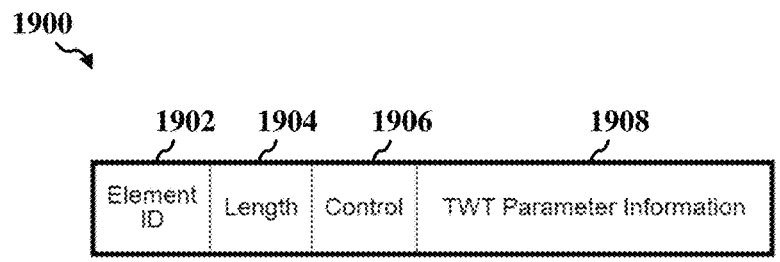
FIG. 19A shows an example structure of a TWT Element usable for wireless communications according to some implementations.

FIG. 19A shows an example structure of a TWT Element 1900 usable for wireless communications according to some implementations. The TWT Element 1900 may include an element ID field 1902, a length field 1904, a control field 1906, and a TWT parameter information field 1908. The element ID field 1902 indicates that the element is a TWT Element. The length field 1904 indicates a length of the TWT Element 1900. The control field 1906 includes various control information for a restricted TWT session advertised by the TWT Element 1900. The TWT parameter information field 1908 contains either a single individual TWT Parameter Set field or one or more Broadcast TWT Parameter Set fields.

Figure 19B:
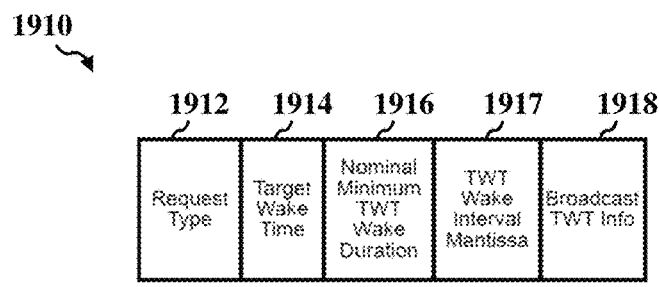
FIG. 19B shows an example structure of a broadcast TWT Parameter Set field usable for wireless communications according to some implementations.

FIG. 19B shows an example structure of a broadcast TWT Parameter Set field 1910 usable for wireless communications according to some implementations. In some instances, the broadcast TWT Parameter Set field 1910 may be included within the TWT Parameter Information field 1908 of FIG. 19A. The broadcast TWT Parameter Set field 1910 may include a Request Type field 1912, a Target Wake Time field 1914, a Nominal Minimum TWT Wake Duration field 1916, a TWT Wake Interval Mantissa field 1917, and a Broadcast TWT Info field 1918. The Request Type field 1912 indicates a type of TWT session requested. The Target Wake Time field 1914 carries an unsigned integer corresponding to a TSF time at which the STA requests to wake.

The Nominal Minimum TWT Wake Duration field 1916 indicates the minimum amount of time that the TWT requesting STA or TWT scheduled STA is expected remain in an awake state or mode. The TWT Wake Interval Mantissa field 1917 may be set to a non-zero value a periodic TWT and a zero value for an aperiodic TWT. The Broadcast TWT Info field 1918 may include a broadcast TWT ID for a corresponding restricted TWT session, and carry information indicating the number of TBTTs during which the Broadcast TWT SPs corresponding to the broadcast TWT Parameter set are present.

FIG. 19C shows an example structure of a Request Type field 1920 of a Broadcast TWT Parameter Set field usable for wireless communications according to some implementations. In some instances, the Request Type field 1920 may be one example of the Request Type field 1912 of FIG. 19C. The Request Type field 1920 may include a TWT Request subfield 1922, a TWT setup command subfield 1924, a trigger subfield 1926, a Last Broadcast Parameter Set subfield 1928, a Flow Type subfield 1930, a Broadcast TWT Recommendation subfield 1932, a TWT Wake Interval Exponent subfield 1934, and a number of reserved bits 1936.

The TWT Request subfield 1922 may carry a value indicating whether the corresponding TWT Information Element was transmitted by a scheduled STA or by a scheduling STA. The TWT Setup Command subfield 1924 may carry values that indicate the type of TWT commands carried in the TWT Information Element. The Trigger subfield 1926 may indicate whether or not the TWT SP indicated by the TWT Element 1900 includes trigger frames or frames carrying a TRS Control subfield.

The Last Broadcast Parameter Set subfield 1928 indicates whether another broadcast TWT Parameter Set follows. For example, the Last Broadcast Parameter Set subfield 1928 may be set to a value of 0 to indicate that there is another TWT Parameter set following this set, or may be set to a value of 1 to indicate that this is the last broadcast TWT Parameter set in the broadcast TWT element. The Flow Type subfield 1930 indicates the type of interaction between the TWT requesting STA or TWT scheduled STA and the TWT responding STA or TWT scheduling AP at a TWT. For example, setting the Flow Type subfield 1930 to a value of 0 indicates an announced TWT in which the TWT requesting STA or the TWT scheduled STA sends a PS-Poll or an APSD trigger frame to signal its awake state. Setting the Flow Type subfield 1930 to a value of 1 indicates an unannounced TWT in which the TWT responding STA or TWT scheduling AP will send a frame to the TWT requesting STA or TWT scheduled STA at TWT without waiting to receive a PS-Poll or an APSD trigger frame.

The Broadcast TWT Recommendation subfield 1932 contains a value that indicates recommendations on the types of frames that are transmitted by TWT scheduled STAs and scheduling AP during the broadcast TWT SP, encoded according to the Broadcast TWT Recommendation subfield 1932 for a broadcast TWT element. In some instances, the Broadcast TWT Recommendation subfield 1932 may indicate whether the restricted TWT session is a peer-to-peer TWT session or a broadcast TWT session. The TWT Wake Interval Exponent subfield 1934 carries a value from which the TWT wake interval can be obtained. In some instances, the TWT Wake Interval Exponent subfield 1934 is set to the value of the exponent of the TWT Wake Interval value in microseconds, base 2.

FIG. 20A shows an example trigger frame 2000 according to some implementations. The trigger frame 2000 may be used as one or more of the trigger frames described with reference to FIGS. 8-15. The trigger frame 2000 is shown to contain a frame control field 2001, a duration field 2002, a receiver address (RA) field 2003, a transmitter address (TA) field 2004, a Common Info field 2005, a number of User Info fields 2006(1)-2006(n), an optional Padding field 2007, and a frame check sequence (FCS) field 2008. In some implementations, the trigger frame 2000 may be an UL OFDMA trigger frame. In some other implementations, the trigger frame 2000 may be an UL MU-MIMO mode trigger frame. The frame control field 2001 contains a Type field and a Sub-type field (not shown for simplicity). The Type field 2001A may store a value to indicate that the trigger frame 2000 is a control frame, and the Sub-type field 2001B may store a value indicating a type of the trigger frame 2000.

The duration field 2002 may store information indicating a duration or length of the trigger frame 2000. The RA field 2003 may store the address of a receiving device, such as one or more of the STAs of FIGS. 8-15. The TA field 1904 may store the address of a transmitting device, such as the AP of FIGS. 8-15. The Common Info field 2005 may store information common to one or more receiving devices. Each of the User Info fields 2006(1)-2006(n) may store information for a particular receiving device containing, for example, the AID of the receiving device. The Padding field 2007 may extend a length of the trigger frame 2000, for example, to give a receiving device additional time to generate a response. The FCS field 2008 may store a frame check sequence (such as for error detection).

FIG. 20B shows an example User Info field 2010 according to some implementations. The User Info field 2010 may be used in one or more of the trigger frames described with reference to FIGS. 8-15. The User Info field 2010 is shown to contain an AID12 field 2011, an RU Allocation field 2012, an ULFEC Coding Type field 2013, an UL HE-MCS field 2014, an UL DCM field 2015, an SS Allocation/RA-RU Information field 2016, an UL Target RSSI field 2017, a reserved field 2018, and a Trigger Dependent User Info field 2019.

Figure 21:
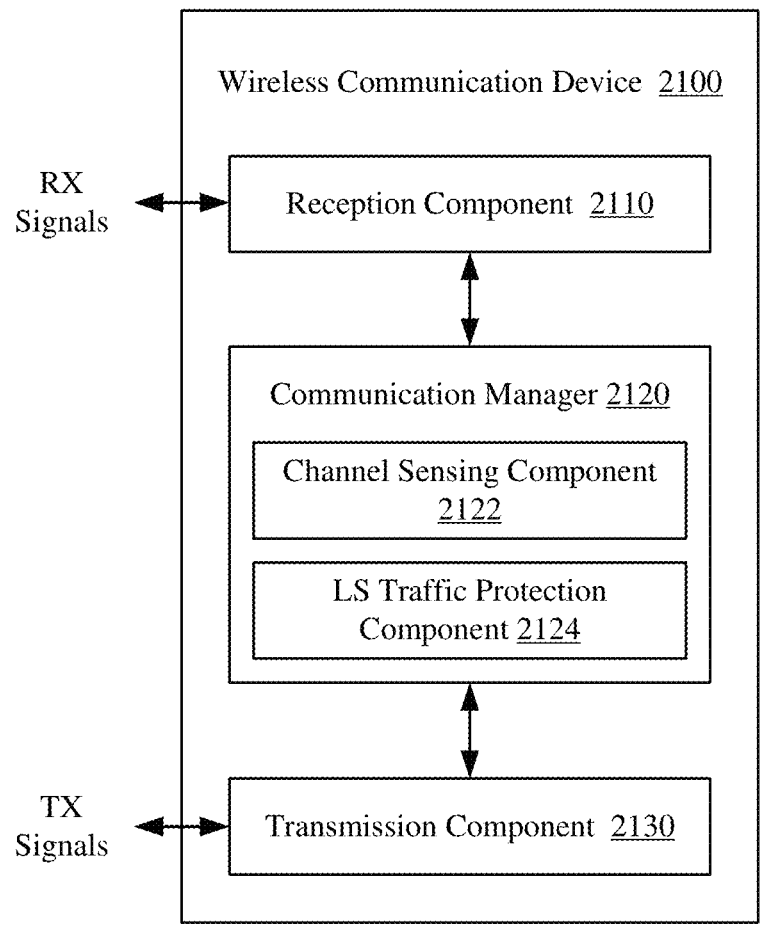
FIG. 21 shows a block diagram of an example wireless communication device according to some implementations.

FIG. 21 shows a block diagram of an example wireless communication device 2100. In some implementations, the wireless communication device 2100 may be configured to perform the process 1600 described above with reference to FIG. 16. The wireless communication device 2100 can be an example implementation of any of the APs 102 of FIG. 1, the wireless communication device 500 of FIG. 5, or the AP 602 of FIG. 6A. More specifically, the wireless communication device 2100 can be a chip, SoC, chipset, package or device that includes at least one processor and at least one modem (for example, a Wi-Fi (IEEE 802.11) modem or a cellular modem).

The wireless communication device 2100 includes a reception component 2110, a communication manager 2120, and a transmission component 2130. The communication manager 2120 further includes a channel sensing component 2122 and a latency-sensitive (LS) traffic protection component 2124. Portions of one or more of the components 2122 or 2124 may be implemented at least in part in hardware or firmware. In some implementations, one or more of the components 2122 or 1424 are implemented at least in part as software stored in a memory (such as the memory 508 of FIG. 5). For example, portions of one or more of the components 2122 or 2124 can be implemented as non-transitory instructions (or "code") executable by a processor (such as the processor 506 of FIG. 5) to perform the functions or operations of the respective component.

The reception component 2110 is configured to receive RX signals from one or more other wireless communication devices and the transmission component 2130 is configured to transmit TX signals to one or more other wireless communication devices. The communication manager 2120 is configured to manage wireless communications with one or more other wireless communication devices. In some implementations, the channel sensing component 2122 may perform a channel sensing operation that indicates whether the wireless channel is busy or idle. The LS traffic protection component 2124 may transmit a response frame or a trigger frame indicating a NAV exception for softAPs collocated with STAs that are associated with the AP and that are members of a r-TWT SP, as well as any client devices associated with the collocated softAP. In some instances, the NAV exception indicates that wireless communication devices subject to the NAV exception do not set their respective NAVs based on the duration indicated in the duration fields of trigger frames transmitted during the r-TWT SP.

Figure 22:
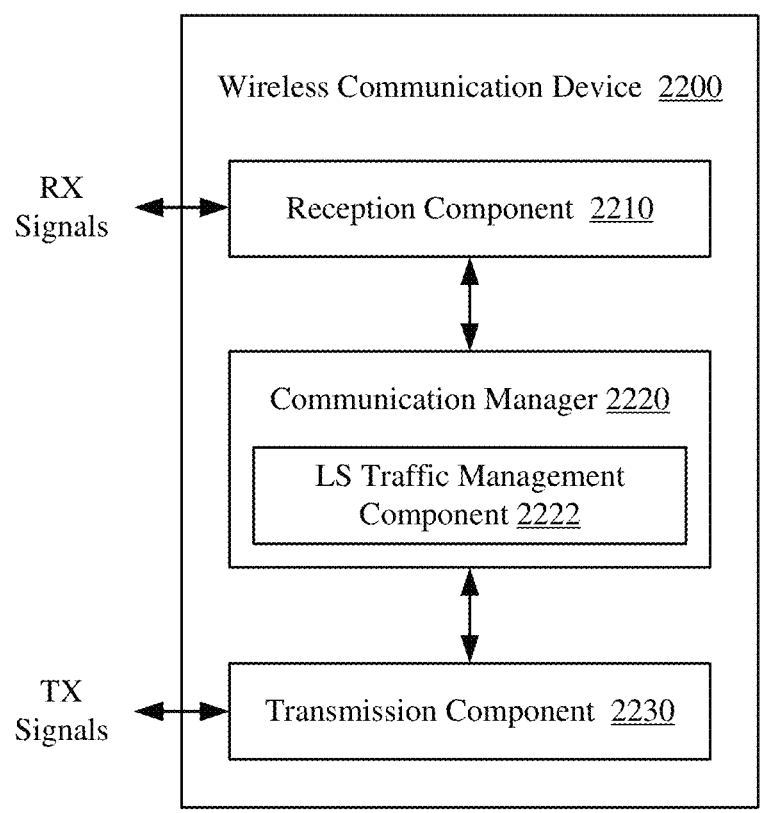
FIG. 22 shows a block diagram of another example wireless communication device according to some implementations.

FIG. 22 shows a block diagram of an example wireless communication device 2200. In some implementations, the wireless communication device 2200 may be configured to perform the processes 1700 and 1800 described with reference to FIGS. 17 and 18. The wireless communication device 2200 can be an example implementation of any of the STAs 104 of FIG. 1, the wireless communication device 500 of FIG. 5, or the STA 604 of FIG. 6B. More specifically, the wireless communication device 2200 can be a chip, SoC, chipset, package or device that includes at least one processor and at least one modem (for example, a Wi-Fi (IEEE 802.11) modem or a cellular modem).

The wireless communication device 2200 includes a reception component 2210, a communication manager 2220, and a transmission component 2230. The communication manager 2220 further includes a latency-sensitive (LS) traffic management component 2222. Portions of the LS traffic management component 2222 may be implemented at least in part in hardware or firmware. In some implementations, the LS traffic management component 2222 is implemented at least in part as software stored in a memory (such as the memory 508 of FIG. 5). For example, portions of the LS traffic management component 2222 can be implemented as non-transitory instructions (or "code") executable by a processor (such as the processor 506 of FIG. 5) to perform the functions or operations of the respective component.

The reception component 2210 is configured to receive RX signals from one or more other wireless communication devices, and the transmission component 2230 is configured to transmit TX signals to one or more other wireless communication devices. The communication manager 2220 is configured to manage wireless communications with one or more other wireless communication devices. In some implementations, the channel sensing component 2222 may receive a response frame or a trigger frame indicating a NAV exception for softAPs collocated with STAs that are associated with the AP and that are members of a r-TWT SP, as well as any client devices associated with the collocated softAP. In some instances, the NAV exception indicates that wireless communication devices subject to the NAV exception do not set their respective NAVs based on the duration indicated in the duration fields of trigger frames transmitted during the r-TWT SP.

Implementation examples are described in the following numbered clauses:

1. A method for wireless communication by an access point (AP), including:
  receiving a request frame from a wireless station (STA) associated with the AP and also associated with a client device via a peer-to-peer (P2P) link, the request frame indicating that the STA intends to exchange P2P communications with the client device during a restricted target wake time (r-TWT) service period (SP) scheduled on a wireless medium, the request frame identifying the client device;
  transmitting a response frame, responsive to receiving the request frame, on the wireless medium to the STA;
  obtaining a transmission opportunity (TXOP) on the wireless medium during the r-TWT SP; and
  transmitting a trigger frame on the wireless medium responsive to obtaining the TXOP, the trigger frame allocating a portion of the obtained TXOP for P2P communications between the STA and the client device, where at least one of the response frame or the trigger frame indicates a Network Allocation Vector (NAV) exception for the client device.

2. The method of clause 1, where each of the response frame and the trigger frame includes a medium access control (MAC) address of the client device.

3. The method of clause 1, where the NAV exception indicates that the client device is to ignore a NAV duration indicated by the trigger frame and a NAV duration indicated by a clear-to-send (CTS) frame responsive to the trigger frame.

4. The method of clause 1, where the STA includes a collocated softAP configured to communicate with the client device, and where the at least one of the response frame or the trigger frame further indicates a NAV exception for the softAP.

5. The method of clause 4, where the NAV exception indicates that softAPs collocated with STAs belonging to the r-TWT SP are to ignore a NAV duration indicated by the trigger frame and a NAV duration indicated by a clear-to-send (CTS) frame responsive to the trigger frame.

6. The method of clause 1, where the trigger frame includes a Carrier Sense (CS) Required field carrying a bit set to a value of 0, where the bit set to the value of 0 indicates the NAV exception.

7. The method of clause 1, where the request frame indicates a medium access control (MAC) address of the client device, and the response frame indicates that the client device is to ignore NAV durations set by trigger frames transmitted from the AP and NAV durations set by clear-to-send (CTS) frames responsive to the trigger frames.

8. The method of clause 7, where the request frame is a TWT request frame that includes a TWT Element indicating the MAC address of the client device, the TWT Element further indicating one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

9. The method of clause 7, where the request frame is a Stream Classification Service (SCS) request frame that includes a traffic specification (TSPEC) Element indicating the MAC address of the client device, the TSPEC Element further indicating a minimum data rate for the restricted TWT session, a mean data rate for the restricted TWT session, a delay bound for the r-TWT SP, and a user priority (UP) for the r-TWT SP.

10. The method of clause 7, where the request frame is a P2P request frame that includes one or more of a TWT Element, a TSPEC Element, or a vendor-specific information element (VSIE) that indicates at least the MAC address of the client device.

11. The method of clause 1, where the response frame indicates how many devices are members of the r-TWT SP.

12. The method of clause 1, where the trigger frame includes a multi-user (MU) Request-to-Send (RTS) TXOP Sharing (TXS) trigger frame.

13. The method of clause 12, where the MU-RTS TXS trigger frame includes a TXOP sharing mode subfield indicating a TXOP sharing mode corresponding to the P2P communications associated with the client device.

14. The method of clause 13, where the TXOP sharing mode subfield indicates a request for the STA to transmit, responsive to the MU-RTS TXS trigger frame, a clear-to-send (CTS) frame including a receiver address field containing the MAC address of the client device.

15. The method of clause 1, where the request frame indicates a first time period during which the STA intends to use the wireless medium within the r-TWT SP, and the trigger frame includes a duration field indicating a second time period during which the portion of the TXOP is allocated for P2P communications associated with the client device, the second time period being shorter than the first time period.

16. The method of clause 15, where the second time period is based on a period of time associated with soliciting the CTS frame from the STA.

17. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a request frame from a wireless station (STA) associated with the AP and also associated with a client device via a peer-to-peer (P2P) link, the request frame indicating that the STA intends to exchange P2P communications with the client device during a restricted target wake time (r-TWT) service period (SP) scheduled on a wireless medium, the request frame identifying the client device;
transmit a response frame, responsive to receiving the request frame, on the wireless medium to the STA;
obtain a transmission opportunity (TXOP) on the wireless medium during the r-TWT SP; and
transmit a trigger frame on the wireless medium responsive to obtaining the TXOP, the trigger frame allocating a portion of the obtained TXOP for P2P communications between the STA and the client device, where at least one of the response frame or the trigger frame indicates a Network Allocation Vector (NAV) exception for the client device.

18. The wireless communication device of clause 17, where each of the response frame and the trigger frame includes a medium access control (MAC) address of the client device.

19. The wireless communication device of clause 17, where the NAV exception indicates that the client device is to ignore a NAV duration indicated by the trigger frame and a NAV duration indicated by a clear-to-send (CTS) frame responsive to the trigger frame.

20. The wireless communication device of clause 17, where the STA includes a collocated softAP configured to communicate with the client device, and where the at least one of the response frame or the trigger frame further indicates a NAV exception for the softAP.

21. The wireless communication device of clause 20, where the NAV exception indicates that softAPs collocated with STAs belonging to the r-TWT SP are to ignore a NAV duration indicated by the trigger frame and a NAV duration indicated by a clear-to-send (CTS) frame responsive to the trigger frame.

22. The wireless communication device of clause 17, where the trigger frame includes a Carrier Sense (CS) Required field carrying a bit set to a value of 0, where the bit set to the value of 0 indicates the NAV exception.

23. The wireless communication device of clause 17, where the request frame indicates a medium access control (MAC) address of the client device, and the response frame indicates that the client device is to ignore NAV durations set by trigger frames transmitted from the AP and NAV durations set by clear-to-send (CTS) frames responsive to the trigger frames.

24. The wireless communication device of clause 23, where the request frame is a TWT request frame that includes a TWT Element indicating the MAC address of the client device, the TWT Element further indicating one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

25. The wireless communication device of clause 23, where the request frame is a Stream Classification Service (SCS) request frame that includes a traffic specification (TSPEC) Element indicating the MAC address of the client device, the TSPEC Element further indicating a minimum data rate for the restricted TWT session, a mean data rate for the restricted TWT session, a delay bound for the r-TWT SP, and a user priority (UP) for the r-TWT SP.

26. The wireless communication device of clause 23, where the request frame is a P2P request frame that includes one or more of a TWT Element, a TSPEC Element, or a vendor-specific information element (VSIE) that indicates at least the MAC address of the client device.

27. The wireless communication device of clause 17, where the response frame indicates how many devices are members of the r-TWT SP.

28. The wireless communication device of clause 17, where the trigger frame includes a multi-user (MU) Request-to-Send (RTS) TXOP Sharing (TXS) trigger frame that includes a TXOP sharing mode subfield indicating a TXOP sharing mode corresponding to the P2P communications associated with the client device.

29. The wireless communication device of clause 28, where the TXOP sharing mode subfield indicates a request for the STA to transmit, responsive to the MU-RTS TXS trigger frame, a clear-to-send (CTS) frame including a receiver address field containing the MAC address of the client device.

30. The wireless communication device of clause 17, where the request frame indicates a first time period during which the STA intends to use the wireless medium within the r-TWT SP, and the trigger frame includes a duration field indicating a second time period during which the portion of the TXOP is allocated for P2P communications associated with the client device, the second time period being shorter than the first time period.

31. A method for wireless communication by a wireless communication device, comprising:
    operating the wireless communication device as a wireless station (STA) associated with an access point (AP), the STA also associated with a client device via a peer-to-peer (P2P) link;
    transmitting a request frame to the AP, the request frame indicating that the STA intends to exchange P2P communications with the client device during a restricted target wake time (r-TWT) service period (SP) scheduled on a wireless medium, the request frame identifying the client device;
    receiving a response frame from the AP on the wireless medium;
    receiving a first trigger frame from the AP on the wireless medium, the first trigger frame allocating a portion of a transmission opportunity (TXOP) obtained by the AP for P2P communications between the STA and the client device, where at least one of the response frame or the first trigger frame indicates a Network Allocation Vector (NAV) exception for the client device; and
    transmitting a clear-to-send (CTS) frame on the wireless medium to the AP, the CTS frame including a receiver address field containing a medium access control (MAC) address of the client device.

32. The method of clause 31, where each of the response frame and the first trigger frame includes the MAC address of the client device.

33. The method of clause 31, where the NAV exception indicates that the client device is to ignore a NAV duration indicated by the first trigger frame and a NAV duration indicated by the CTS frame.

34. The method of clause 31, where the wireless communication device includes a softAP collocated with the STA, the collocated softAP configured to communicate with the client device, and where the at least one of the response frame or the trigger frame further indicates a NAV exception for the softAP.

35. The method of clause 34, where the NAV exception indicates that softAPs collocated with STAs belonging to the r-TWT SP are to ignore a NAV duration indicated by the first trigger frame and a NAV duration indicated by the CTS frame.

36. The method of clause 31, where the first trigger frame includes a Carrier Sense (CS) Required field carrying a bit set to a value of 0, where the bit set to the value of 0 indicates the NAV exception.

37. The method of clause 31, where the request frame indicates a medium access control (MAC) address of the client device, and the response frame indicates that the client device is to ignore NAV durations set by the first trigger frame and the CTS frame.

38. The method of clause 37, where the request frame is a TWT request frame that includes a TWT Element indicating the MAC address of the client device, the TWT Element further indicating one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

39. The method of clause 37, where the request frame is a Stream Classification Service (SCS) request frame that includes a traffic specification (TSPEC) Element indicating the MAC address of the client device, the TSPEC Element further indicating a minimum data rate for the restricted TWT session, a mean data rate for the restricted TWT session, a delay bound for the r-TWT SP, and a user priority (UP) for the r-TWT SP.

40. The method of clause 37, where the request frame is a P2P request frame that includes one or more of a TWT Element, a TSPEC Element, or a vendor-specific information element (VSIE) that indicates at least the MAC address of the client device.

41. The method of clause 31, where the request frame includes a request for the AP to transmit multi-user (MU) Request-to-Send (RTS) TXOP Sharing (TXS) trigger frames or basic trigger frames when soliciting P2P communications between the STA and the client device.

42. The method of clause 31, where the trigger frame includes a multi-user (MU) Request-to-Send (RTS) TXOP Sharing (TXS) trigger frame that includes a TXOP sharing mode subfield indicating a TXOP sharing mode associated with the P2P communications between the STA and the client device.

43. The method of clause 31, further including:
    transmitting, on the wireless medium, a second trigger frame soliciting P2P communications from the client device, the second trigger frame including the MAC address of the client device; and receiving a P2P transmission from the client device responsive to the second trigger frame.

44. The method of clause 43, where the STA determines that the wireless medium is idle for at least a short interframe space (SIFS) duration prior to transmitting the second trigger frame to the client device.

45. The method of clause 44, where the P2P communications are received over a tunneled direct-link setup (TDLS) link established between the STA and the client device.

46. The method of clause 31, where the request frame indicates a first time period during which the STA intends to use the wireless medium within the r-TWT SP, and the first trigger frame includes a duration field indicating a second time period during which the portion of the TXOP is allocated for P2P communications associated with the client device, the second time period being shorter than the first time period.

47. The method of clause 46, where the second time period is based on a period of time associated with soliciting the CTS frame from the STA.

48. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
operate the wireless communication device as a wireless station (STA) associated with an access point (AP), the STA also associated with a client device via a peer-to-peer (P2P) link;
transmit a request frame to the AP, the request frame indicating that the STA intends to exchange P2P communications with the client device during a restricted target wake time (r-TWT) service period (SP) scheduled on a wireless medium, the request frame identifying the client device;
receive a response frame from the AP on the wireless medium;
receive a first trigger frame from the AP on the wireless medium, the first trigger frame allocating a portion of a transmission opportunity (TXOP) obtained by the AP for P2P communications between the STA and the client device, where at least one of the response frame or the first trigger frame indicates a Network Allocation Vector (NAV) exception for the client device; and
transmit a clear-to-send (CTS) frame on the wireless medium to the AP, the CTS frame including a receiver address field containing a medium access control (MAC) address of the client device.

49. The wireless communication device of clause 48, where each of the response frame and the first trigger frame includes the MAC address of the client device.

50. The wireless communication device of clause 48, where the NAV exception indicates that the client device is to ignore a NAV duration indicated by the first trigger frame or a NAV duration indicated by the CTS frame.

51. The wireless communication device of clause 48, where the wireless communication device includes a softAP collocated with the STA, the collocated softAP configured to communicate with the client device, and where the at least one of the response frame or the trigger frame further indicates a NAV exception for the softAP.

52. The wireless communication device of clause 51, where the NAV exception indicates that softAPs collocated with STAs belonging to the r-TWT SP are to ignore a NAV duration indicated by the first trigger frame and a NAV duration indicated by the CTS frame.

53. The wireless communication device of clause 48, where the first trigger frame includes a Carrier Sense (CS) Required field carrying a bit set to a value of 0, where the bit set to the value of 0 indicates the NAV exception.

54. The wireless communication device of clause 48, where the request frame indicates a medium access control (MAC) address of the client device, and the response frame indicates that the client device is to ignore NAV durations set by the first trigger frame and the CTS frame.

55. The wireless communication device of clause 48, where the request frame is a TWT request frame that includes a TWT Element indicating the MAC address of the client device, the TWT Element further indicating one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

56. The wireless communication device of clause 55, where the request frame is a Stream Classification Service (SCS) request frame that includes a traffic specification (TSPEC) Element indicating the MAC address of the client device, the TSPEC Element further indicating a minimum data rate for the restricted TWT session, a mean data rate for the restricted TWT session, a delay bound for the r-TWT SP, and a user priority (UP) for the r-TWT SP.

57. The wireless communication device of clause 55, where the request frame is a P2P request frame that includes one or more of a TWT Element, a TSPEC Element, or a vendor-specific information element (VSIE) that indicates at least the MAC address of the client device.

58. The wireless communication device of clause 48, where the request frame includes a request for the AP to transmit multi-user (MU) Request-to-Send (RTS) TXOP Sharing (TXS) trigger frames or basic trigger frames when soliciting P2P communications between the STA and the client device.

59. The wireless communication device of clause 48, where the trigger frame includes a multi-user (MU) Request-to-Send (RTS) TXOP Sharing (TXS) trigger frame that includes a TXOP sharing mode subfield indicating a TXOP sharing mode corresponding to the P2P communications associated with the client device.

60. The wireless communication device of clause 48, where execution of the processor-readable code is further configured to:
transmit, on the wireless medium, a second trigger frame soliciting P2P communications from the client device, the second trigger frame including the MAC address of the client device; and
receive a P2P transmission from the client device responsive to the second trigger frame.

61. The wireless communication device of clause 60, where the STA determines that the wireless medium is idle for at least a short interframe space (SIFS) duration prior to transmitting the second trigger frame to the client device.

62. The wireless communication device of clause 60, where the P2P communications are received over a tunneled direct-link setup (TDLS) link established between the STA and the client device.

63. The wireless communication device of clause 48, where the request frame indicates a first time period during which the STA intends to use the wireless medium within the r-TWT SP, and the first trigger frame includes a duration field indicating a second time period during which the portion of the TXOP is allocated for P2P communications associated with the client device, the second time period being shorter than the first time period.

64. The wireless communication device of clause 63, where the second time period is based on a period of time associated with soliciting the CTS frame from the STA.

65. A method for wireless communication by an access point (AP), including:
- receiving a request frame from a wireless station (STA) associated with the AP and also associated with a client device, the request frame indicating that the STA intends to exchange peer-to-peer (P2P) communications with the client device on a wireless medium, the request frame identifying the client device;
- obtaining a transmission opportunity (TXOP) on the wireless medium; and
- transmitting a trigger frame on the wireless medium responsive to obtaining the TXOP, the trigger frame allocating a portion of the obtained TXOP for P2P communications between the STA and the client device, where at least one of the trigger frame or a response frame indicates a Network Allocation Vector (NAV) exception for the client device.

66. The method of clause 65, where the trigger frame includes a medium access control (MAC) address of the client device.

67. The method of clause 65, where the NAV exception indicates that the client device is to ignore a NAV duration indicated by the trigger frame and a NAV duration indicated by a clear-to-send (CTS) frame responsive to the trigger frame.

68. The method of clause 65, where the STA is collocated with a softAP configured to communicate with the client device, and where the trigger frame further indicates a NAV exception for the softAP.

69. The method of clause 68, where the NAV exception indicates that softAPs collocated with STAs associated with the AP are to ignore a NAV duration indicated by the trigger frame and a NAV duration indicated by a clear-to-send (CTS) frame responsive to the trigger frame.

70. The method of clause 65, where the trigger frame includes a Carrier Sense (CS) Required field carrying a bit set to a value of 0, where the bit set to the value of 0 indicates the NAV exception.

71. The method of clause 65, further including:
- transmitting a response frame, responsive to receiving the request frame, on the wireless medium to the STA, the response frame indicating the NAV exception for the client device.

72. The method of clause 71, where the request frame indicates a medium access control (MAC) address of the client device, and the response frame indicates that the client device is to ignore NAV durations set by trigger frames transmitted from the AP and NAV durations set by clear-to-send (CTS) frames responsive to the trigger frames.

73. The method of clause 72, where the request frame is a Stream Classification Service (SCS) request frame that includes a traffic specification (TSPEC) Element indicating the MAC address of the client device, the TSPEC Element further indicating a traffic stream (TS), a minimum data rate for protocol data units (PDUs) associated with the TS, a mean data rate for PDUs associated with the TS, a delay bound for the TS, and a user priority (UP) for the TS.

74. The method of clause 72, where the request frame is a P2P request frame that includes one or more of a TWT Element, a TSPEC Element, or a vendor-specific information element (VSIE) that indicates at least the MAC address of the client device.

75. The method of clause 65, where the trigger frame includes a multi-user (MU) Request-to-Send (RTS) TXOP Sharing (TXS) trigger frame.

76. The method of clause 75, where the MU-RTS TXS trigger frame includes a TXOP sharing mode subfield indicating a TXOP sharing mode corresponding to P2P communications associated with the client device.

77. The method of clause 76, where the TXOP sharing mode subfield indicates a request for the STA to transmit, responsive to the MU-RTS TXS trigger frame, a clear-to-send (CTS) frame including a receiver address field containing the MAC address of the client device.

78. A wireless communication device including:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to perform the operations of any one or more of clauses 65-77.

79. A method for wireless communication by a wireless communication device, including:
- operating the wireless communication device as a wireless station (STA) associated with an access point (AP), the STA also associated with a client device via a peer-to-peer (P2P) link;
- transmitting a request frame to the AP, the request frame indicating that the STA intends to exchange P2P communications with the client device on a wireless medium, the request frame identifying the client device;
- receiving a first trigger frame from the AP on the wireless medium, the first trigger frame allocating a portion of a transmission opportunity (TXOP) obtained by the AP for P2P communications between the STA and the client device, where at least one of the first trigger frame or a response frame indicates a Network Allocation Vector (NAV) exception for the client device; and
- transmitting a clear-to-send (CTS) frame on the wireless medium to the AP, the CTS frame including a receiver address field containing a medium access control (MAC) address of the client device.

80. The method of clause 79, where the first trigger frame includes the MAC address of the client device.

81. The method of clause 79, where the NAV exception indicates that the client device is to ignore a NAV duration indicated by the first trigger frame and a NAV duration indicated by a clear-to-send (CTS) frame responsive to the first trigger frame.

82. The method of clause 79, where the wireless communication device includes a softAP collocated with the STA, the collocated softAP configured to communicate with the client device, and where the at least one of the response frame or the first trigger frame further indicates a NAV exception for the softAP.

83. The method of clause 82, where the NAV exception indicates that softAPs collocated with STAs associated with the AP are to ignore a NAV duration indicated by the first trigger frame and a NAV duration indicated by a clear-to-send (CTS) frame responsive to the trigger frame.

84. The method of clause 79, where the first trigger frame includes a Carrier Sense (CS) Required field carrying a bit set to a value of 0, where the bit set to the value of 0 indicates the NAV exception.

85. The method of clause 79, further including:
receiving a response frame from the AP on the wireless medium, the response frame responsive to the request frame and indicating the NAV exception for the client device.

86. The method of clause 85, where the request frame indicates a medium access control (MAC) address of the client device, and the response frame indicates that the client device is to ignore NAV durations set by trigger frames transmitted from the AP and NAV durations set by clear-to-send (CTS) frames responsive to the trigger frames.

87. The method of clause 86, where the request frame is a Stream Classification Service (SCS) request frame that includes a traffic specification (TSPEC) Element indicating the MAC address of the client device, the TSPEC Element further indicating a traffic stream (TS), a minimum data rate for protocol data units (PDUs) associated with the TS, a mean data rate for PDUs associated with the TS, a delay bound for the TS, and a user priority (UP) for the TS.

88. The method of clause 86, where the request frame is a P2P request frame that includes one or more of a TWT Element, a TSPEC Element, or a vendor-specific information element (VSIE) that indicates at least the MAC address of the client device.

89. The method of clause 79, where the first trigger frame includes a multi-user (MU) Request-to-Send (RTS) TXOP Sharing (TXS) trigger frame.

90. The method of clause 89, where the MU-RTS TXS trigger frame includes a TXOP sharing mode subfield indicating a TXOP sharing mode corresponding to P2P communications associated with the client device.

91. The method of clause 90, where the TXOP sharing mode subfield indicates a request for the STA to transmit, responsive to the MU-RTS TXS trigger frame, a clear-to-send (CTS) frame including a receiver address field containing the MAC address of the client device.

92. The method of clause 79, further including:
transmitting, on the wireless medium, a second trigger frame soliciting P2P communications from the client device, the second trigger frame including the MAC address of the client device; and
receiving a P2P transmission from the client device responsive to the second trigger frame.

93. The method of clause 92, where the STA determines that the wireless medium is idle for at least a short interframe space (SIFS) duration prior to transmitting the second trigger frame to the client device.

94. The method of clause 92, where the P2P communications are received over a tunneled direct-link setup (TDLS) link established between the softAP and the client device.

95. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the operations of any one or more of clauses 79-94.

96. A method for wireless communication by an access point (AP), including:
receiving a request frame from a wireless station (STA) associated with the AP and collocated with a softAP associated with a peer-to-peer (P2P) client device, the request frame indicating that the softAP intends to exchange P2P communications with the client device during a restricted target wake time (r-TWT) service period (SP) scheduled on a wireless medium;
obtaining a transmission opportunity (TXOP) on the wireless medium during the r-TWT SP; and
transmitting, to the STA over the wireless medium, a multi-user (MU) Request-to-Send (RTS) TXOP Sharing (TXS) trigger frame that allocates a portion of the obtained TXOP for P2P communications between the softAP and the client device, the MU-RTS TXS trigger frame indicating a sharing mode associated with a Network Allocation Vector (NAV) exception for the softAP.

97. The method of clause 96, where the request frame includes a Vendor-Specific Information Element (VSIE) indicating the intention to exchange P2P communications with the client device.

98. The method of clause 96, where the NAV exception indicates that the softAP is to ignore a NAV duration indicated by the MU-RTS TXS trigger frame.

99. The method of clause 98, where the NAV exception further indicates that the client device is to ignore the NAV duration indicated by the MU-RTS TXS trigger frame.

100. The method of clause 99, where the MU-RTS TXS trigger frame indicates a medium access control (MAC) address of the softAP and a MAC address of the client device.

101. The method of clause 96, where the NAV exception indicates that softAPs collocated with STAs belonging to the r-TWT SP are to ignore NAV durations indicated by the MU-RTS TXS trigger frame.

102. The method of clause 96, further including:
transmitting a response frame to the AP on the wireless medium responsive to receiving the request frame, the response frame indicating how many devices are members of the r-TWT SP.

103. The method of clause 96, where the MU-RTS TXS trigger frame includes a Carrier Sense (CS) Required field carrying a bit set to a value of 0, where the bit set to the value of 0 indicates the NAV exception.

104. The method of clause 96, where the request frame is a TWT request frame that includes a TWT Element indicating the MAC address of the client device, the TWT Element further indicating one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

105. The method of clause 96, where the request frame is a Stream Classification Service (SCS) request frame that includes a traffic specification (TSPEC) Element indicating the MAC address of the client device, the TSPEC Element further indicating a minimum data rate for the r-TWT SP, a mean data rate for the r-TWT SP, a delay bound for the r-TWT SP, and a user priority (UP) for the r-TWT SP.

106. The method of clause 96, where the request frame is a P2P request frame that includes one or more of a TWT Element, a TSPEC Element, or a vendor-specific information element (VSIE) that indicates at least the MAC address of the client device.

107. The method of clause 96, where the request frame indicates a first time period during which the STA intends to use the wireless medium within the r-TWT SP, and the MU-RTS TXS trigger frame includes a duration field indicating a second time period during which the portion of the TXOP is allocated for P2P communications associated with the client device, the second time period being shorter than the first time period.

108. The method of clause 107, where the second time period is based on a period of time associated with soliciting the CTS frame from the STA.

109. A wireless communication device including:
  at least one modem;
  at least one processor communicatively coupled with the at least one modem; and
  at least one memory communicatively coupled with the at least one processor and storing processor-readable code that, when executed by the at least one processor in conjunction with the at least one modem, is configured to perform the operations of any one or more of clauses 96-108.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by an access point (AP), comprising:
  receiving a request frame from a wireless station (STA) associated with the AP and also associated with a client device via a peer-to-peer (P2P) link, the request frame indicating that the STA intends to exchange P2P communications with the client device during a restricted target wake time (r-TWT) service period (SP) scheduled on a wireless medium, the request frame identifying the client device;
  transmitting a response frame, responsive to receiving the request frame, on the wireless medium to the STA;
  obtaining a transmission opportunity (TXOP) on the wireless medium during the r-TWT SP; and
  transmitting a trigger frame on the wireless medium responsive to obtaining the TXOP, the trigger frame allocating a portion of the obtained TXOP for P2P communications between the STA and the client device, wherein at least one of the response frame or the trigger frame indicates a Network Allocation Vector (NAV) exception for the client device.

2. The method of claim 1, wherein each of the response frame and the trigger frame includes a medium access control (MAC) address of the client device.

3. The method of claim 1, wherein the NAV exception indicates that the client device is to ignore a NAV duration indicated by the trigger frame and a NAV duration indicated by a clear-to-send (CTS) frame responsive to the trigger frame.

4. The method of claim 1, wherein the STA includes a collocated softAP configured to communicate with the client device, and wherein the at least one of the response frame or the trigger frame further indicates a NAV exception for the softAP.

5. The method of claim 4, wherein the NAV exception indicates that softAPs collocated with STAs belonging to the r-TWT SP are to ignore a NAV duration indicated by the trigger frame and a NAV duration indicated by a clear-to-send (CTS) frame responsive to the trigger frame.

6. The method of claim 1, wherein the trigger frame includes a Carrier Sense (CS) Required field carrying a bit set to a value of 0, wherein the bit set to the value of 0 indicates the NAV exception.

7. The method of claim 1, wherein the request frame indicates a medium access control (MAC) address of the client device, and the response frame indicates that the client device is to ignore NAV durations set by trigger frames transmitted from the AP and NAV durations set by clear-to-send (CTS) frames responsive to the trigger frames.

8. The method of claim 7, wherein the request frame is a TWT request frame that includes a TWT Element indicating the MAC address of the client device, the TWT Element further indicating one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

9. The method of claim 7, wherein the request frame is a Stream Classification Service (SCS) request frame that includes a traffic specification (TSPEC) Element indicating the MAC address of the client device, the TSPEC Element further indicating a minimum data rate for the restricted TWT session, a mean data rate for the restricted TWT session, a delay bound for the r-TWT SP, and a user priority (UP) for the r-TWT SP.

10. The method of claim 7, wherein the request frame is a P2P request frame that includes one or more of a TWT Element, a TSPEC Element, or a vendor-specific information element (VSIE) that indicates at least the MAC address of the client device.

11. The method of claim 1, wherein the response frame indicates how many devices are members of the r-TWT SP.

12. The method of claim 1, wherein the trigger frame comprises a multi-user (MU) Request-to-Send (RTS) TXOP Sharing (TXS) trigger frame.

13. The method of claim 12, wherein the MU-RTS TXS trigger frame includes a TXOP sharing mode subfield indicating a TXOP sharing mode corresponding to the P2P communications associated with the client device.

14. The method of claim 13, wherein the TXOP sharing mode subfield indicates a request for the STA to transmit, responsive to the MU-RTS TXS trigger frame, a clear-to-send (CTS) frame including a receiver address field containing the MAC address of the client device.

15. The method of claim 1, wherein the request frame indicates a first time period during which the STA intends to use the wireless medium within the r-TWT SP, and the trigger frame includes a duration field indicating a second time period during which the portion of the TXOP is allocated for P2P communications associated with the client device, the second time period being shorter than the first time period.

16. The method of claim 15, wherein the second time period is based on a period of time associated with soliciting the CTS frame from the STA.

17. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a request frame from a wireless station (STA) associated with the AP and also associated with a client device via a peer-to-peer (P2P) link, the request frame indicating that the STA intends to exchange P2P communications with the client device during a restricted target wake time (r-TWT) service period (SP) scheduled on a wireless medium, the request frame identifying the client device;
transmit a response frame, responsive to receiving the request frame, on the wireless medium to the STA;
obtain a transmission opportunity (TXOP) on the wireless medium during the r-TWT SP; and
transmit a trigger frame on the wireless medium responsive to obtaining the TXOP, the trigger frame allocating a portion of the obtained TXOP for P2P communications between the STA and the client device, wherein at least one of the response frame or the trigger frame indicates a Network Allocation Vector (NAV) exception for the client device.

18. The wireless communication device of claim 17, wherein each of the response frame and the trigger frame includes a medium access control (MAC) address of the client device.

19. The wireless communication device of claim 17, wherein the NAV exception indicates that the client device is to ignore a NAV duration indicated by the trigger frame and a NAV duration indicated by a clear-to-send (CTS) frame responsive to the trigger frame.

20. The wireless communication device of claim 17, wherein the STA includes a collocated softAP configured to communicate with the client device, and wherein the at least one of the response frame or the trigger frame further indicates a NAV exception for the softAP.

21. The wireless communication device of claim 20, wherein the NAV exception indicates that softAPs collocated with STAs belonging to the r-TWT SP are to ignore a NAV duration indicated by the trigger frame and a NAV duration indicated by a clear-to-send (CTS) frame responsive to the trigger frame.

22. The wireless communication device of claim 17, wherein the trigger frame includes a Carrier Sense (CS) Required field carrying a bit set to a value of 0, wherein the bit set to the value of 0 indicates the NAV exception.

23. The wireless communication device of claim 17, wherein the request frame indicates a medium access control (MAC) address of the client device, and the response frame indicates that the client device is to ignore NAV durations set by trigger frames transmitted from the AP and NAV durations set by clear-to-send (CTS) frames responsive to the trigger frames.

24. The wireless communication device of claim 23, wherein the request frame is a TWT request frame that includes a TWT Element indicating the MAC address of the client device, the TWT Element further indicating one or more of a periodicity of the r-TWT SP, a duration of the r-TWT SP, a sharing mode of the r-TWT SP, a wake duration of the r-TWT SP, a flow type of the r-TWT SP, or a parameter set of the r-TWT SP.

25. The wireless communication device of claim 23, wherein the request frame is a Stream Classification Service (SCS) request frame that includes a traffic specification (TSPEC) Element indicating the MAC address of the client device, the TSPEC Element further indicating a minimum data rate for the restricted TWT session, a mean data rate for the restricted TWT session, a delay bound for the r-TWT SP, and a user priority (UP) for the r-TWT SP.

26. The wireless communication device of claim 23, wherein the request frame is a P2P request frame that includes one or more of a TWT Element, a TSPEC Element, or a vendor-specific information element (VSIE) that indicates at least the MAC address of the client device.

27. The wireless communication device of claim 17, wherein the response frame indicates how many devices are members of the r-TWT SP.

28. The wireless communication device of claim 17, wherein the trigger frame comprises a multi-user (MU) Request-to-Send (RTS) TXOP Sharing (TXS) trigger frame that includes a TXOP sharing mode subfield indicating a TXOP sharing mode corresponding to the P2P communications associated with the client device.

29. The wireless communication device of claim 28, wherein the TXOP sharing mode subfield indicates a request for the STA to transmit, responsive to the MU-RTS TXS trigger frame, a clear-to-send (CTS) frame including a receiver address field containing the MAC address of the client device.

30. The wireless communication device of claim 17, wherein the request frame indicates a first time period during which the STA intends to use the wireless medium within the r-TWT SP, and the trigger frame includes a duration field indicating a second time period during which the portion of the TXOP is allocated for P2P communications associated with the client device, the second time period being shorter than the first time period.

* * * * *